US012061432B2

(12) United States Patent
Kamigaito et al.

(10) Patent No.: US 12,061,432 B2
(45) Date of Patent: Aug. 13, 2024

(54) IMAGE FORMING APPARATUS

(71) Applicant: FUJIFILM Business Innovation Corp., Tokyo (JP)

(72) Inventors: Naoya Kamigaito, Kanagawa (JP); Shohei Miyagawa, Kanagawa (JP); Mitsuaki Kuroda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 256 days.

(21) Appl. No.: 17/590,250

(22) Filed: Feb. 1, 2022

(65) Prior Publication Data

US 2023/0067608 A1 Mar. 2, 2023

(30) Foreign Application Priority Data

Aug. 25, 2021 (JP) ................................ 2021-137593

(51) Int. Cl.
*B65H 29/60* (2006.01)
*G03G 15/00* (2006.01)
(Continued)

(52) U.S. Cl.
CPC ......... *G03G 15/6529* (2013.01); *B65H 29/60* (2013.01); *B65H 1/00* (2013.01);
(Continued)

(58) Field of Classification Search
CPC ...... G03G 15/6529; B65H 29/60; B65H 1/00; B65H 5/00; B65H 29/00; B65H 2553/00
See application file for complete search history.

(56) References Cited

U.S. PATENT DOCUMENTS 6,308,027 B1 10/2001 Obu et al.
7,080,834 B2 * 7/2006 Asari .................... B65H 29/58 271/902

(Continued)

FOREIGN PATENT DOCUMENTS

JP 59-007966 A 1/1984
JP 2004-93605 A 3/2004

OTHER PUBLICATIONS

Extended European Search Report dated Sep. 23, 2022 from the European Patent Office in EP Application No. 22166249.7.

*Primary Examiner* — Thomas A Morrison
(74) *Attorney, Agent, or Firm* — Sughrue Mion, PLLC

(57) ABSTRACT

An image forming apparatus includes: an apparatus body; an image forming unit that forms a toner image on a recording medium; a first transport part that transports the recording medium to the image forming unit along a feed path extending from one side toward the other side in the horizontal direction, the feed path being a path along which the recording medium transported by the first transport part passes, and that includes a portion extending toward the one side beyond the image forming unit; and a second transport part that transports the recording medium from the image forming unit to the outside of the apparatus body along a discharge path extending from the other side toward one side in the horizontal direction and that includes a portion extending toward the one side beyond the image forming unit, the discharge path and the feed path at least partially overlapping each other in the vertical direction.

9 Claims, 15 Drawing Sheets

(51) Int. Cl.
*B65H 1/00* (2006.01)
*B65H 5/00* (2006.01)
*B65H 29/00* (2006.01)

(52) U.S. Cl.
CPC ................ *B65H 5/00* (2013.01); *B65H 29/00* (2013.01); *B65H 2553/00* (2013.01)

(56) References Cited

U.S. PATENT DOCUMENTS

| | | | | |
|---|---|---|---|---|
| 2003/0230841 | A1 | 12/2003 | Hiramoto et al. | |
| 2006/0239771 | A1 | 10/2006 | Hayashi et al. | |
| 2009/0127775 | A1* | 5/2009 | Takahashi | B65H 29/00 271/225 |
| 2010/0044949 | A1* | 2/2010 | Nakamura | B65H 43/06 271/3.17 |
| 2012/0251212 | A1 | 10/2012 | Hasegawa et al. | |
| 2015/0307301 | A1* | 10/2015 | Nakano | H01F 7/122 271/265.01 |
| 2017/0108811 | A1 | 4/2017 | Tomioka et al. | |
| 2021/0364970 | A1* | 11/2021 | Sato | G03G 15/657 |

* cited by examiner

IMAGE FORMING APPARATUS

CROSS-REFERENCE TO RELATED APPLICATIONS

This application is based on and claims priority under 35 USC 119 from Japanese Patent Application No. 2021-137593 filed Aug. 25, 2021.

BACKGROUND

(i) Technical Field

The present disclosure relates to an image forming apparatus.

(ii) Related Art

Japanese Unexamined Patent Application Publication No. 59-7966 discloses a transfer-paper transport device in which a recording head having a light-emitting element array and an image-forming system is moved at a constant speed in a substantially generatrix direction of a photoconductor drum rotating at a constant speed to helically scan the photoconductor drum to form an electrostatic latent image, and a toner image obtained by developing this image is transferred to a transfer paper.

In some known image forming apparatuses, an image forming unit for forming a toner image on a recording medium and a feed path along which the recording medium to be transported toward the image forming unit passes are arranged side-by-side in the horizontal direction. Also in some cases, the image forming unit and a discharge path along which a recording medium having a toner image formed thereon and to be discharged from the image forming unit to the outside of the apparatus body passes are arranged side-by-side in the horizontal direction. In these image forming apparatuses, because the feed path and the discharge path are located away from each other in the horizontal direction, the area occupied by the feed path and the discharge path in the horizontal direction is large.

SUMMARY

Aspects of non-limiting embodiments of the present disclosure relate to reducing the area occupied by the feed path and the discharge path in the horizontal direction, compared with a case where the feed path along which the recording medium to be transported to the image forming unit passes and the discharge path along which the recording medium to be discharged from the image forming unit to the outside of the apparatus body passes are located away from each other in the horizontal direction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an apparatus body; an image forming unit that forms a toner image on a recording medium; a first transport part that transports the recording medium to the image forming unit along a feed path extending from one side toward the other side in the horizontal direction, the feed path being a path along which the recording medium transported by the first transport part passes, and that includes a portion extending toward the one side beyond the image forming unit; and a second transport part that transports the recording medium from the image forming unit to an outside of the apparatus body along a discharge path extending from the other side toward one side in the horizontal direction and that includes a portion extending toward the one side beyond the image forming unit, the discharge path and the feed path at least partially overlapping each other in the vertical direction.

BRIEF DESCRIPTION OF THE DRAWINGS

Exemplary embodiment of the present disclosure will be described in detail based on the following figures, wherein.

DETAILED DESCRIPTION

Referring to FIGS. 1 to 15, an example image forming apparatus according to an exemplary embodiment of the present disclosure will be described. The arrows H, W, and D in the figures represent the top-bottom direction (vertical direction), the width direction (horizontal direction), and the depth direction (horizontal direction) of the image forming apparatus.

Image Forming Apparatus 10

Figure 13:
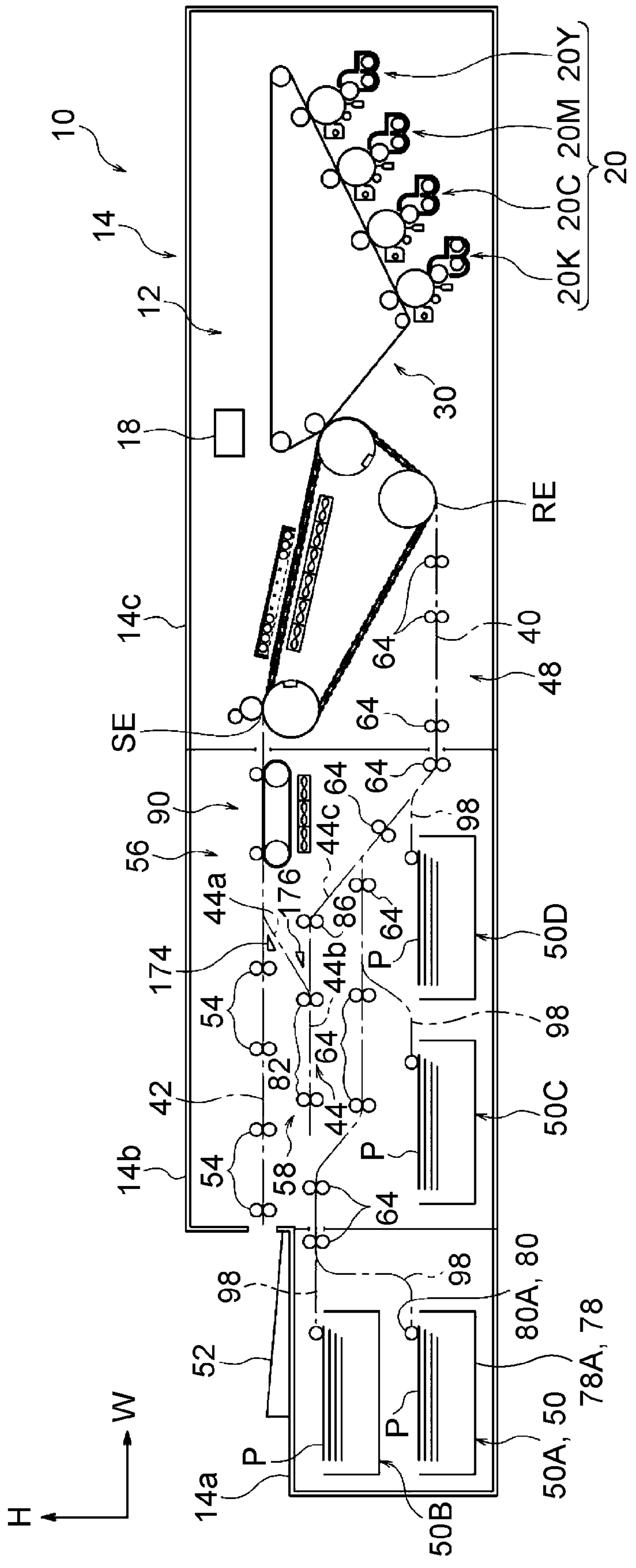
FIG. 13 schematically shows the configuration of the image forming apparatus according to the exemplary embodiment of the present disclosure.

An image forming apparatus 10 according to this exemplary embodiment electrophotographically forms a toner image on a sheet member P, serving as a recording medium. As shown in FIG. 13, the image forming apparatus 10 includes storage parts 50, a paper feed mechanism 48, an image forming unit 12, a paper output mechanism 56, an output part 52, a reversing mechanism 58, and a controller 18 that controls these components. The image forming apparatus 10 also includes an apparatus body 14 that accommodates these components. The apparatus body 14 includes three substantially rectangular-parallelepiped-shaped housings disposed side-by-side in the width direction. The three housings include a housing 14*a*, a housing 14*b*, and a housing 14*c* in this order from one side (left side) in the width direction. The housing 14*a* is lower than the housing 14*b* in the vertical direction. Thus, the upper portion of the side surface on one side (left side) of the housing 14*b* in the width direction is exposed.

Storage Part 50

The storage parts 50 accommodate sheet members P. The image forming apparatus 10 includes four storage parts 50. The sheet members P are selectively sent out from the four storage parts 50.

In this exemplary embodiment, three storage parts 50 are disposed side-by-side in the width direction, and one storage part 50 is disposed above the storage part 50 that is disposed at one end (left end) in the width direction, among the three storage parts 50. In other words, two storage parts 50 are disposed one on top of the other in the vertical direction, and two storage parts 50 are disposed side-by-side in the width direction, on the other side (right side), in the width direction, of the storage part 50 that is located on the lower side among the two storage parts 50.

For ease of explanation, the storage part 50 disposed at one end (left end) in the width direction, among the three storage parts 50 arranged side-by-side in the width direction, is called a storage part 50A, the storage part 50 disposed above the storage part 50A is called a storage part 50B, the storage part 50 disposed beside the storage part 50A is called a storage part 50C, and the storage part 50 disposed to the right of the storage part 50C is called a storage part 50D. When there is no need to distinguish between the storage parts 50, the letters A, B, C, and D are omitted.

The storage parts 50A and 50B are disposed in the housing 14*a*. The storage parts 50C and 50D are disposed in the housing 14*b*.

The storage parts 50 each include a loading part 78 in which sheet members P are loaded, and a feed-out roller 80 that feeds out the top sheet member P in the loading part 78 to the feed path 40.

Furthermore, feed-out paths 98, along which a sheet member P sent out from the loading parts 78 by the feed-out rollers 80 passes, extend from the storage parts 50, and terminal ends of the feed-out paths 98 join the feed path 40, along which a sheet member P transported to the image forming unit 12 passes.

Paper Feed Mechanism 48

The paper feed mechanism 48 transports a sheet member P accommodated in a storage part 50 to a chain gripper 66 provided in a fixing device 100 of the image forming unit 12.

More specifically, as shown in FIG. 13, the paper feed mechanism 48 includes multiple transport rollers 64 for transporting the sheet member P along the feed path 40. The details of the paper feed mechanism 48 will be described below.

Image Forming Unit 12

The image forming unit 12 electrophotographically forms an image on a sheet member P. As shown in FIG. 13, the image forming unit 12 is disposed to the other side (right side) of the storage parts 50 in the width direction. The image forming unit 12 is disposed in the housing 14*c*. The image forming unit 12 includes toner-image forming units 20 that form toner images, a transfer device 30 that transfers the toner images formed by the toner-image forming units 20 to a sheet member P, and the fixing device 100 that fixes the toner images to the sheet member P.

There are multiple toner-image forming units 20 that form different color toner images. The image forming unit 12 includes a total of four toner-image forming units 20, which correspond to yellow (Y), magenta (M), cyan (C), and black (K). The letters (Y), (M), (C), and (K) shown in FIG. 13 are suffixed to the components corresponding to these colors. When there is no need to distinguish between the colors Y, M, C, and K, these letters are omitted.

Toner-Image Forming Unit 20

The toner-image forming units 20Y, 20M, 20C, and 20K have basically the same configuration except for the toners used.

Figure 2:
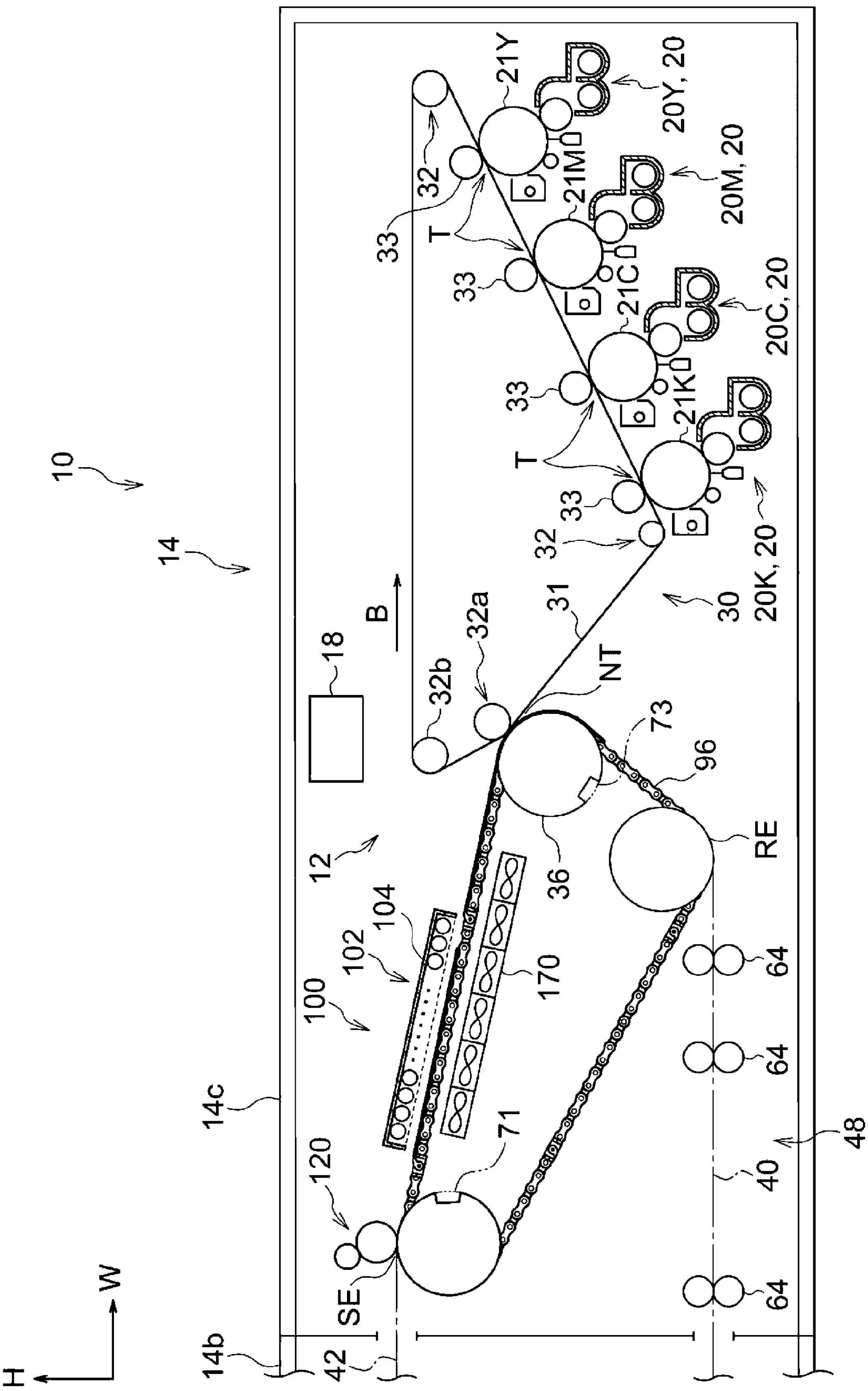
FIG. 2 is a side view showing an image forming unit of the image forming apparatus according to the exemplary embodiment of the present disclosure.

As shown in FIG. 2, the toner-image forming units 20Y, 20M, 20C, and 20K are arranged in a line along an inclined portion of a transfer belt 31 provided in the transfer device 30.

Figure 12:
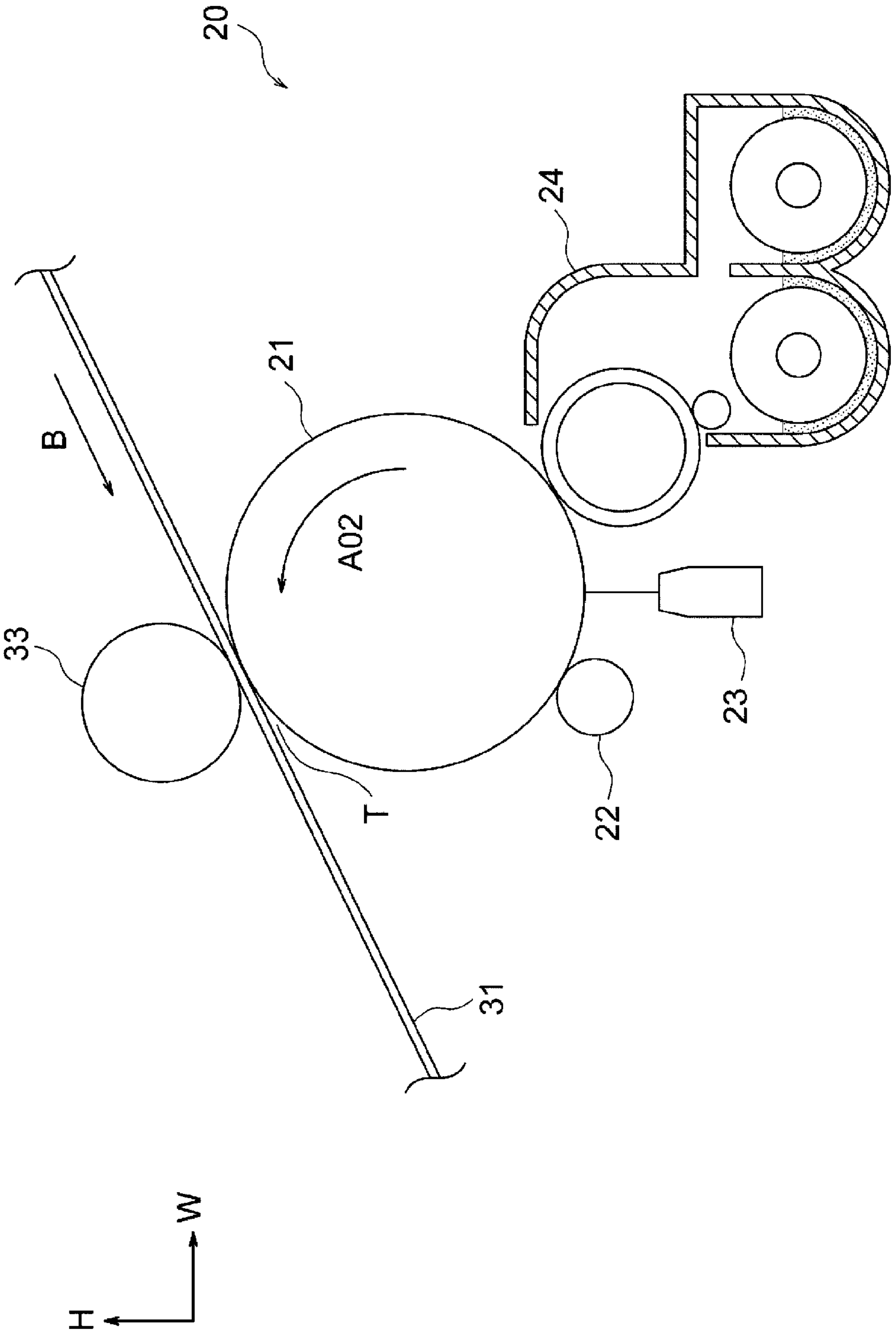
FIG. 12 shows the configuration of a toner-image forming unit of the image forming apparatus according to the exemplary embodiment of the present disclosure.

As shown in FIG. 12, each toner-image forming unit 20 includes a photoconductor drum 21 (photoconductor) that rotates in the direction of arrow A02, and a charger 22 that charges the photoconductor drum 21. The toner-image forming unit 20 further includes an exposure device 23 that exposes the photoconductor drum 21 charged by the charger 22 to form an electrostatic latent image, and a developing device 24 that develops the electrostatic latent image with toner to form a toner image.

Transfer Device 30

The transfer device 30 first-transfers, in a superposed manner, the toner images formed on the photoconductor drums 21 corresponding to the respective colors to an intermediate transfer body and then second-transfers the superposed toner image to a sheet member P. More specifically, as shown in FIG. 2, the transfer device 30 includes: the transfer belt 31, serving as the intermediate transfer body; multiple rollers 32; first transfer rollers 33; a second transfer roller 36; and a removal part (not shown).

The transfer belt 31 is an endless belt stretched over the multiple rollers 32 in a substantially inverted triangular orientation. The toner-image forming units 20Y, 20M, 20C, and 20K are arranged in a line along the inclined portion on the other side (right side) of the transfer belt 31 in the width direction. The transfer belt 31 revolves in the direction of arrow B when at least one of the multiple rollers 32 is rotationally driven.

Furthermore, in the description below, among the multiple rollers 32, the roller 32 that is disposed so as to outwardly push an inclined portion of the transfer belt 31 on one side (left side) in the width direction is called a roller 32*a*, and the roller 32 over which a portion of the transfer belt 31 on one side in the width direction is stretched is called a roller 32*b*.

The first transfer rollers 33 are opposed to the photoconductor drums 21 corresponding to the respective colors with the transfer belt 31 therebetween. The first transfer rollers 33 transfer the toner images formed on the photoconductor drums 21 to the transfer belt 31 at first transfer positions T (see FIG. 12) between the photoconductor drums 21 and the first transfer rollers 33.

The second transfer roller 36 is opposed to the roller 32*a* with the transfer belt 31 therebetween. The second transfer roller 36 transfers the toner image transferred to the transfer belt 31 to a sheet member P at a second transfer position NT between the transfer belt 31 and the second transfer roller 36.

The removal part (not shown) is disposed on the opposite side of the transfer belt 31 from the roller 32*b* to remove a material deposited on the transfer belt 31.

Fixing Device 100

The fixing device 100 fixes the toner image transferred to the sheet member P by the transfer device 30 to the sheet member P.

Figure 3:
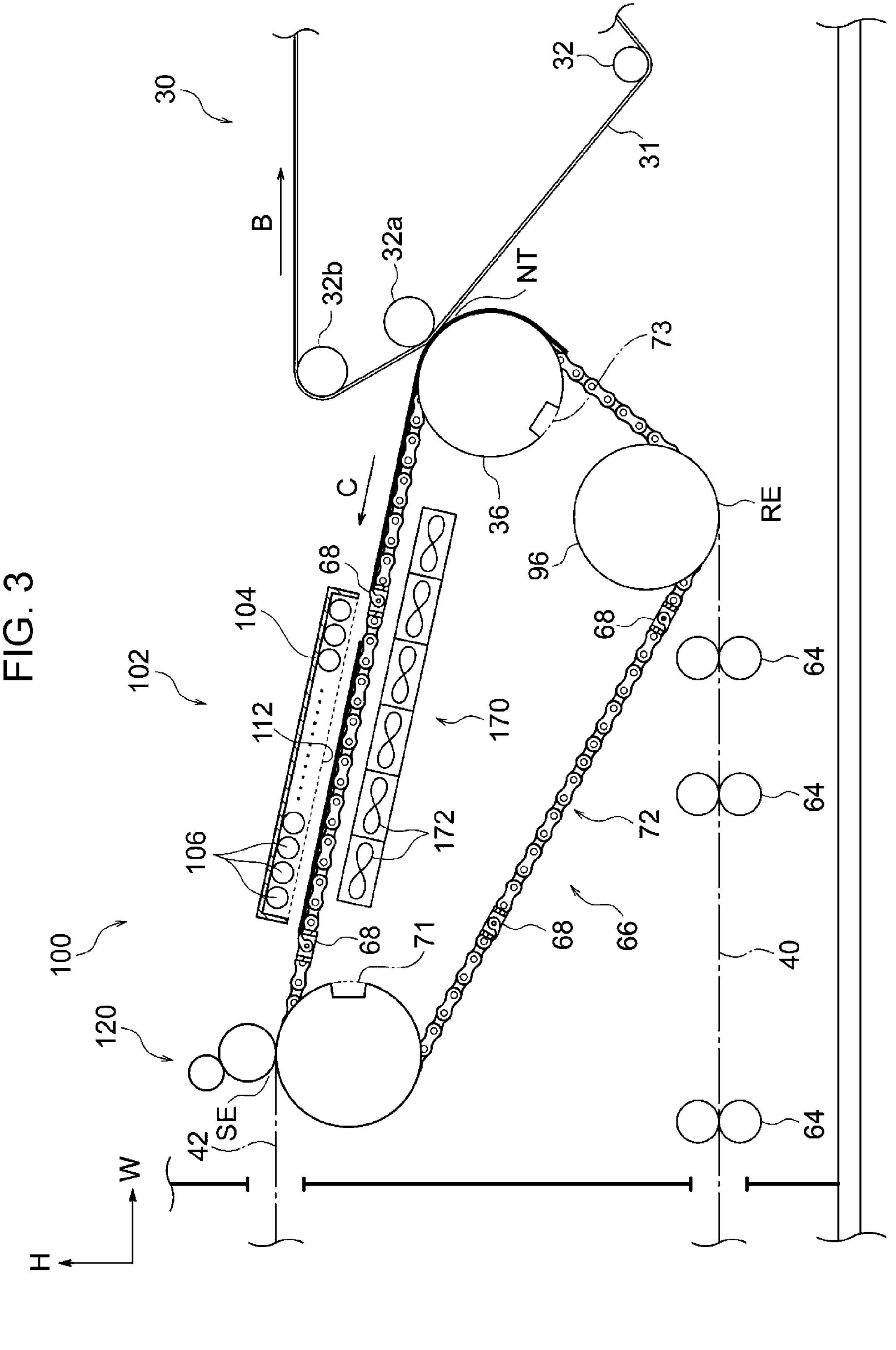
FIG. 3 is a side view showing a fixing device of the image forming unit of the image forming apparatus according to the exemplary embodiment of the present disclosure.

As shown in FIG. 3, the fixing device 100 includes: the chain gripper 66; a preheater 102 that heats, in a non-contact manner, the toner image transferred to the sheet member P; a heater 120 that comes into contact with the sheet member P to heat the toner image; and a blowing unit 170.

Chain Gripper 66

The chain gripper 66 includes a pair of chains 72, leading-end holding parts 68 that hold the leading ends of sheet members P, and pairs of sprockets 71, 73, and 96.

Figure 10:
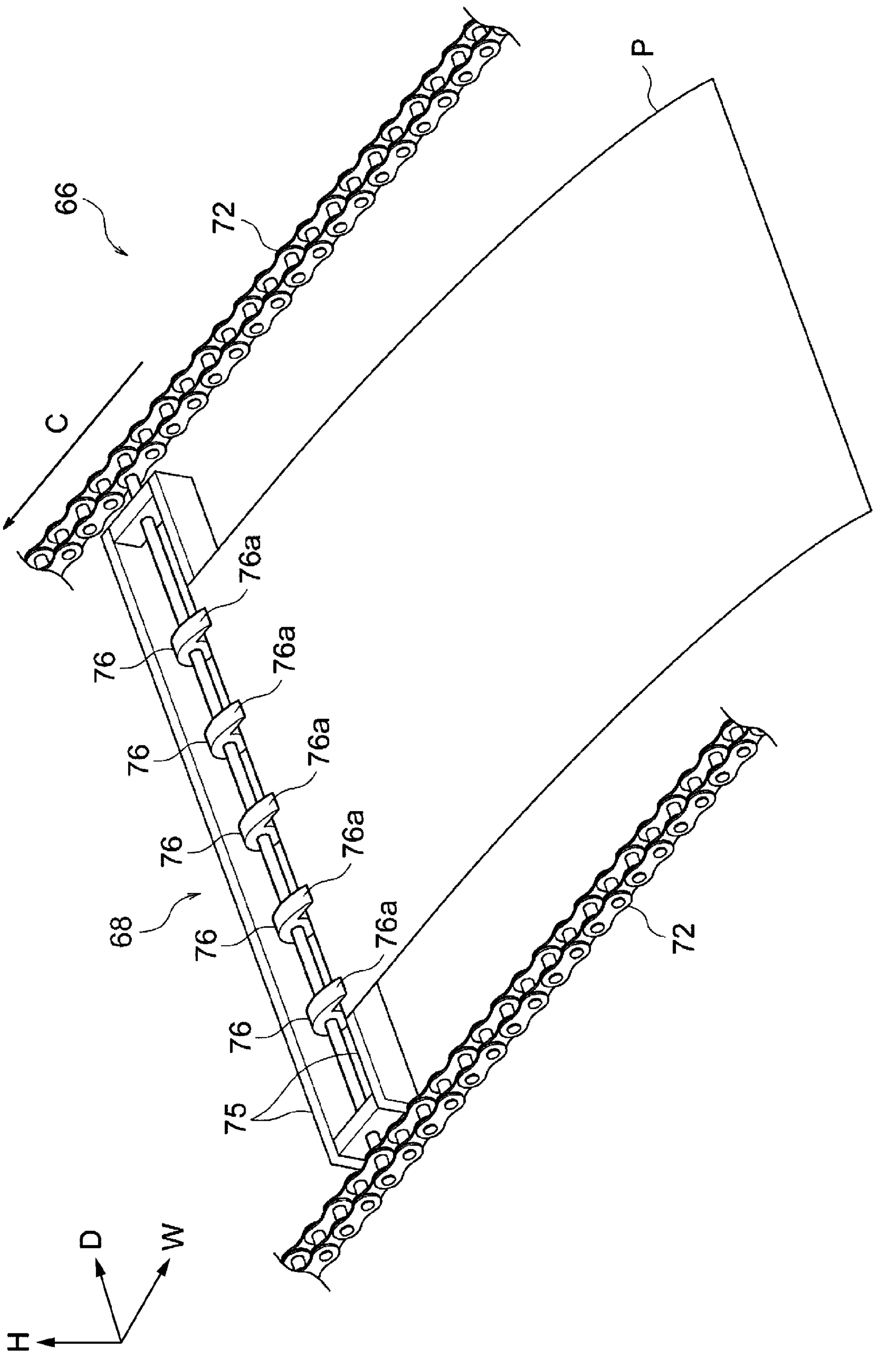
FIG. 10 is a perspective view showing a chain gripper in the fixing device of the image forming unit of the image forming apparatus according to the exemplary embodiment of the present disclosure.

As shown in FIG. 10, the chains 72 are endless chains and are located at a distance from each other in the depth direction. As shown in FIG. 3, the chains 72 are wound on: the pair of sprockets 73 (see FIG. 9), which are disposed at the ends of the second transfer roller 36 in the axial direction and have axes extending in the depth direction; the pair of sprockets 71 (see FIG. 7), which are disposed at one end and the other end of a pressure roller 140 (described below) in the axial direction and have axes extending in the depth direction; and the pair of sprockets 96, which are located at a distance from each other in the depth direction.

Furthermore, the sprockets 71 (see FIG. 7) at the ends of the pressure roller 140 and the sprockets 73 (see FIG. 9) at the ends of the second transfer roller 36 are disposed such that no other sprockets therebetween. When viewed in the depth direction, the sprockets 71 are disposed to one side (left side) of the sprockets 73 in the depth direction and above the sprockets 73.

Furthermore, when viewed in the depth direction, the pair of sprockets 96 are disposed below the sprockets 73 and 71, to on one side of the sprockets 73 in the width direction, and to the other side of the sprockets 71 in the width direction. Furthermore, a transport roller (not shown) that is coaxial with the pair of sprockets 96 is disposed between the pair of sprockets 96.

As described, the pair of sprockets 96 are disposed below the sprockets 71 and 73.

As shown in FIG. 10, each leading-end holding part 68 includes an attachment member 75 extending in the depth direction, and grippers 76 attached to the attachment member 75. The ends of the leading-end holding part 68 in the depth direction are attached to the chains 72.

The leading-end holding parts 68 are disposed at predetermined intervals in the circumferential direction (revolve direction) of the chains 72 (see FIG. 3).

The grippers 76 are attached to the attachment member 75 at predetermined intervals in the depth direction. The grippers 76 hold the leading end of a sheet member P. More specifically, the grippers 76 have jaws 76*a*. The attachment member 75 has a contact part 75*a* (see FIG. 8) with which the jaws 76*a* come into contact.

The grippers 76 hold a sheet member P by pinching the leading end of the sheet member P between the jaws 76*a* and the contact part 75*a*. In the grippers 76, for example, the jaws 76*a* are pressed against the contact part 75*a* by springs or the like, and the jaws 76*a* are brought toward and away from the contact part 75*a* by the effect of cams or the like.

In this configuration, when a rotational force is transmitted to any one of the multiple sprockets 71, 73, and 96 shown in FIG. 3, the chains 72 revolve in the direction of arrow C so as to move from the sprockets 73 side toward the sprockets 71 side.

Furthermore, when a leading-end holding part 68 attached to the chains 72 reaches a receiving position RE at the bottom of the sprockets 96, the grippers 76 of the leading-end holding part 68 pinch the leading end of the sheet member P transported along the feed path 40 by the transport rollers 64, thus receiving and holding the sheet member P. The chains 72 revolving in the direction of arrow C transport the sheet member P held by the leading-end holding part 68 to the second transfer position NT, allow the sheet member P to face the preheater 102, and then transport the sheet member P toward the heater 120. At a send-out position SE immediately after the heater 120, the leading-end holding part 68 releases the leading end of the sheet member P, and the chain gripper 66 sends the sheet member P to a discharge path 42 (described below).

Preheater 102

As shown in FIG. 3, the preheater 102 is disposed so as to face the top surface of the sheet member P that is being transported, on the downstream side of the second transfer position NT in the transport direction of the sheet member P (hereinbelow, the "sheet transport direction"). The preheater 102 includes a reflection member 104, multiple infrared heaters 106 (hereinbelow, "heaters 106"), and a wire screen 112.

The reflection member 104 is made of an aluminum plate in the shape of a shallow box that is open on the side facing the sheet member P that is being transported. In other words, when viewed in the width direction, the reflection member 104 has a U shape that is open on the side facing the sheet member P that is being transported. The heaters 106 are cylindrical infrared heaters extending in the depth direction. The heaters 106 are arranged side-by-side in the sheet transport direction. The wire screen 112 is fixed to the edge of the reflection member 104 with fixing members (not shown) to divide the inside of the reflection member 104 from the outside.

In this configuration, the preheater 102 heats, in a non-contact manner and from the thickness direction of the sheet member P, the sheet member P transported by the revolving chains 72. Heating the sheet member P softens the toner of the toner image transferred to the sheet member P.

Blowing Unit 170

Figure 6:
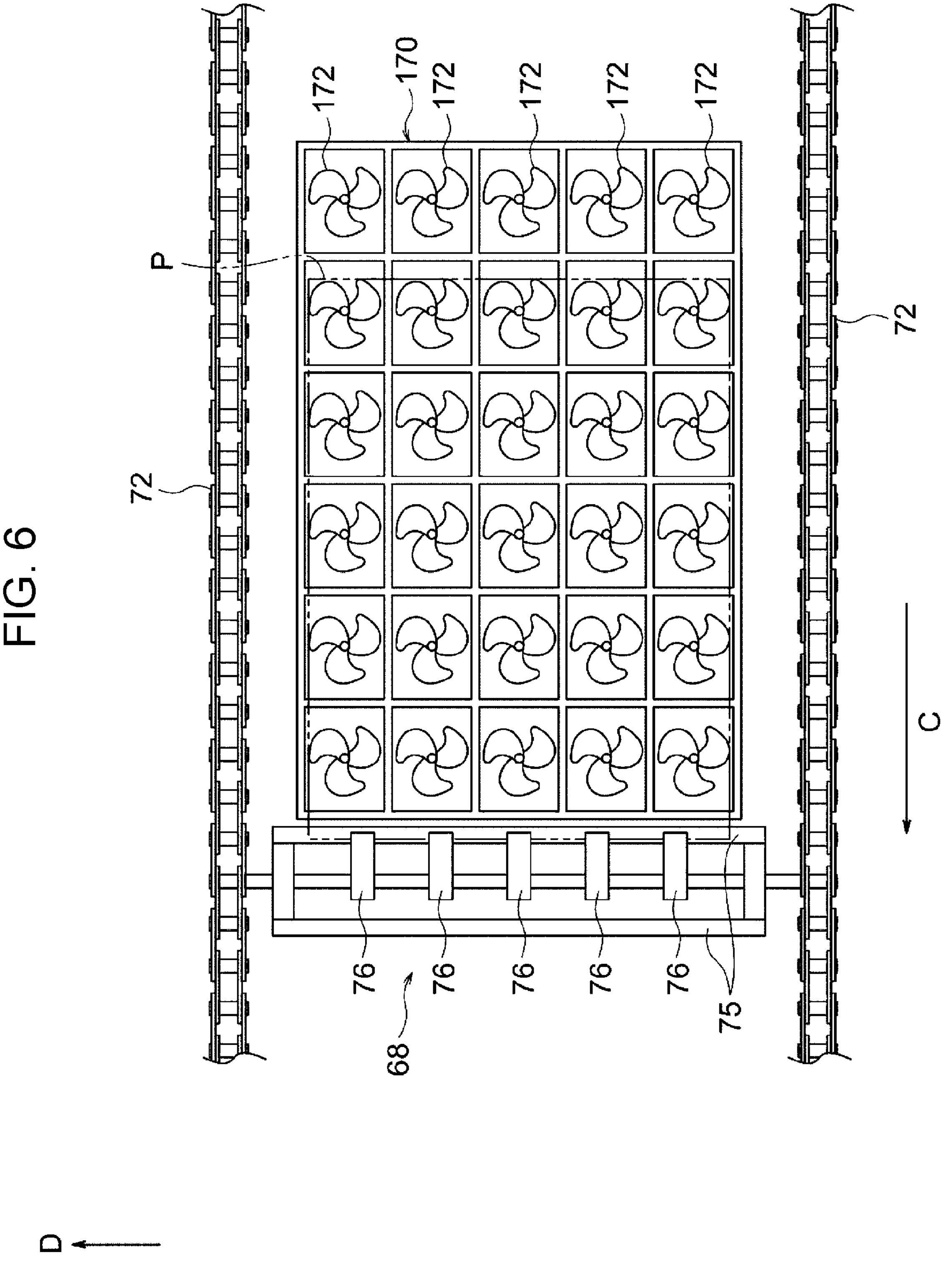
FIG. 6 is a plan view showing a blowing unit in the fixing device of the image forming unit of the image forming apparatus according to the exemplary embodiment of the present disclosure.

As shown in FIG. 3, the blowing unit 170 is disposed so as to oppose the preheater 102 in the thickness direction of the sheet member P that is being transported, and the sheet member P that is being transported passes between the blowing unit 170 and the preheater 102. As shown in FIG. 6, the blowing unit 170 includes multiple fans 172 arranged in the width direction of the sheet member P that is being transported and the sheet transport direction.

In this configuration, the orientation of the sheet member P that is being transported is stabilized by the fans 172 blowing air at the sheet member P.

Heater 120

As shown in FIG. 3, the heater 120 is disposed downstream of the preheater 102 in the sheet transport direction.

Figure 7:
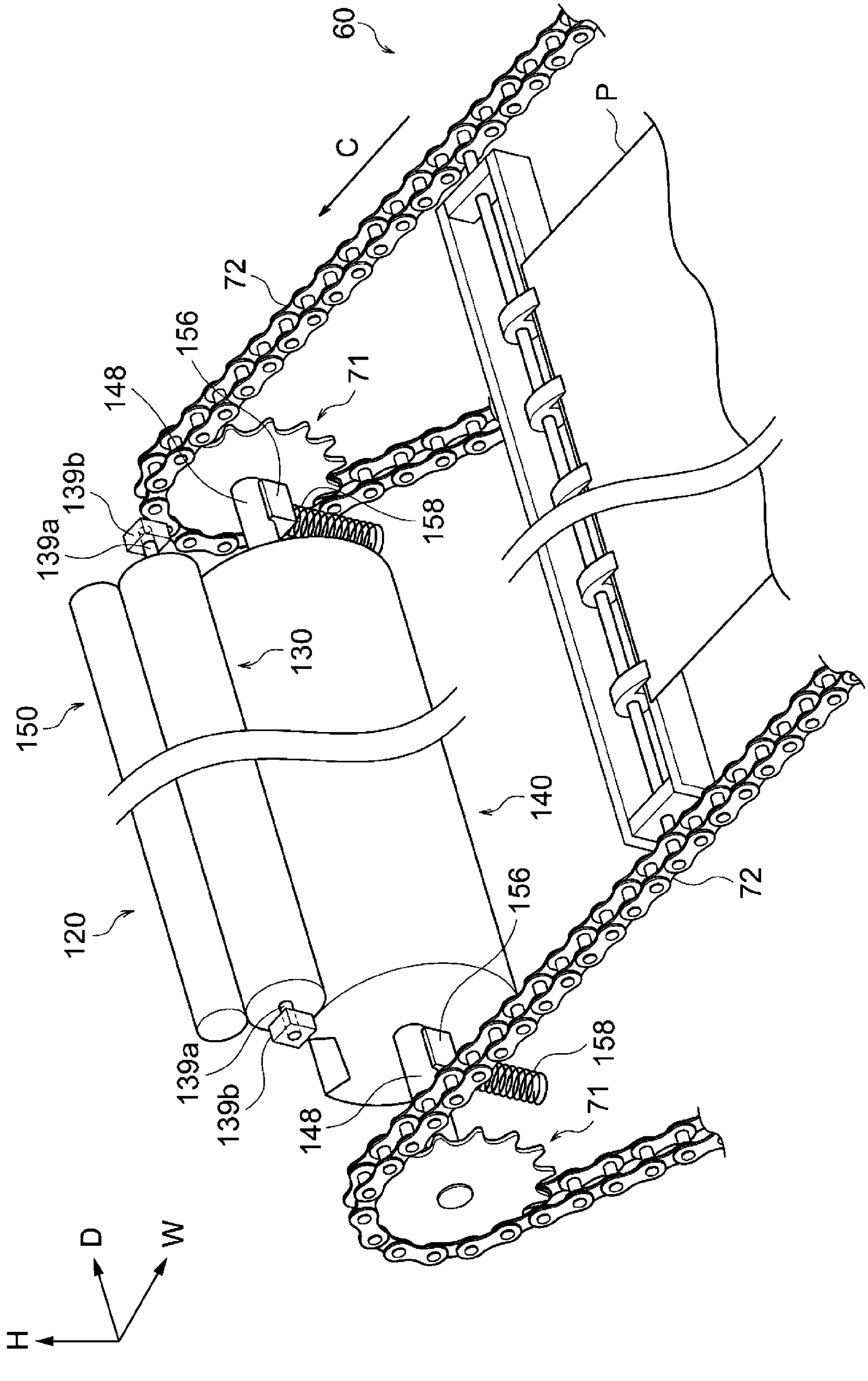
FIG. 7 is a perspective view showing a heater in the fixing device of the image forming unit of the image forming apparatus according to the exemplary embodiment of the present disclosure.

As shown in FIG. 7, the heater 120 includes a heating roller 130 that comes into contact with the sheet member P that is being transported to heat the sheet member P, a pressure roller 140 that presses the sheet member P against the heating roller 130, and a driven roller 150 that is rotated by the heating roller 130.

The heating roller 130 comes into contact with the upper side of the sheet member P that is being transported. The heating roller 130 extends in the depth direction such that the axial direction thereof is parallel to the depth direction. The heating roller 130 has, at the ends thereof in the depth direction, shafts 139*a* extending in the depth direction and support members 139*b* for supporting the shafts 139*a*.

The driven roller 150 is disposed on the opposite side of the heating roller 130 from the sheet member P that is being transported, and extends in the depth direction such that the axial direction thereof is parallel to the depth direction. The driven roller 150 has a heater (not shown). In this configuration, the driven roller 150 is rotated by the heating roller 130. The driven roller 150 heats the heating roller 130.

Figure 8:
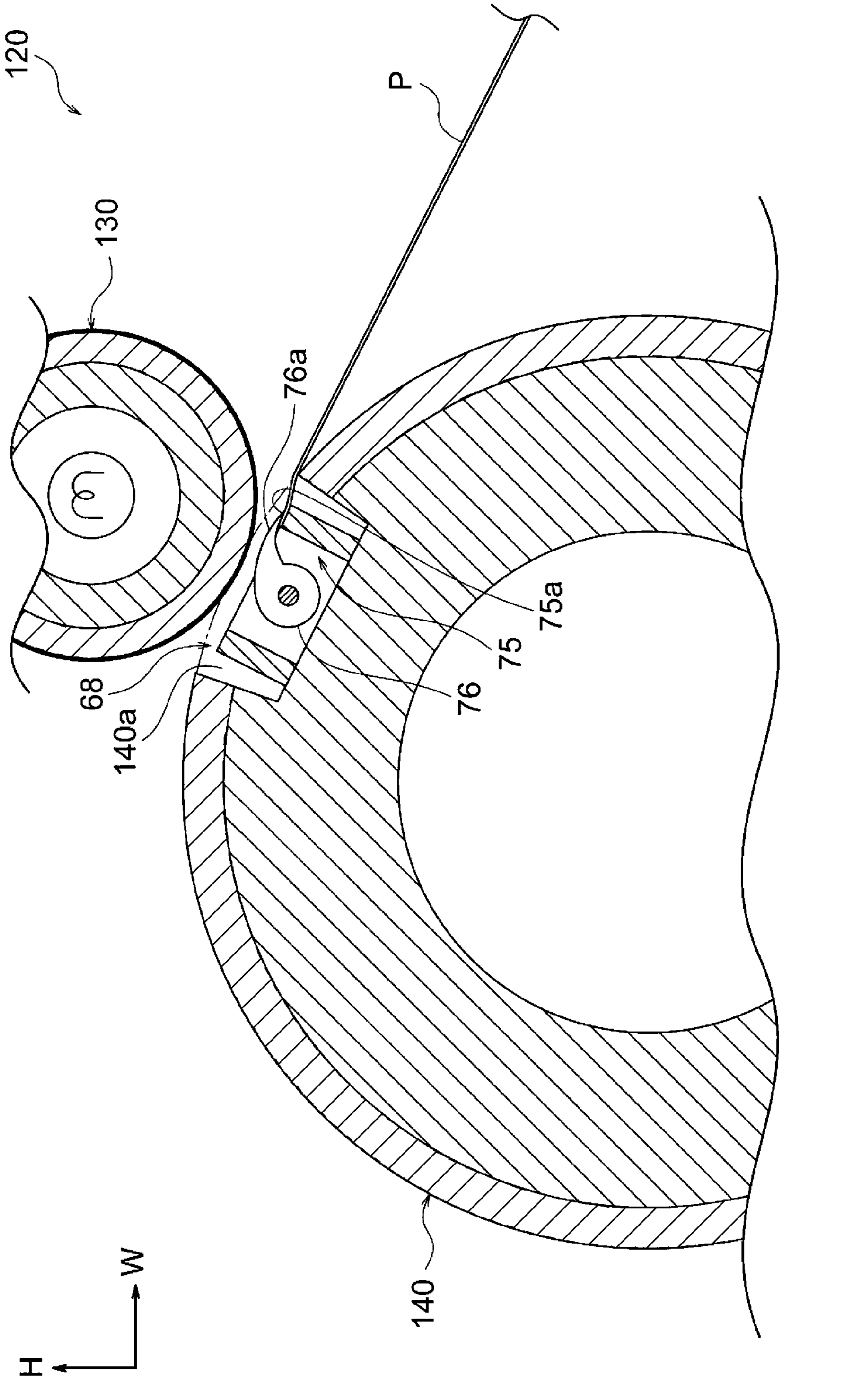
FIG. 8 is a sectional view showing the heater in the fixing device of the image forming unit of the image forming apparatus according to the exemplary embodiment of the present disclosure.
Figure 9:
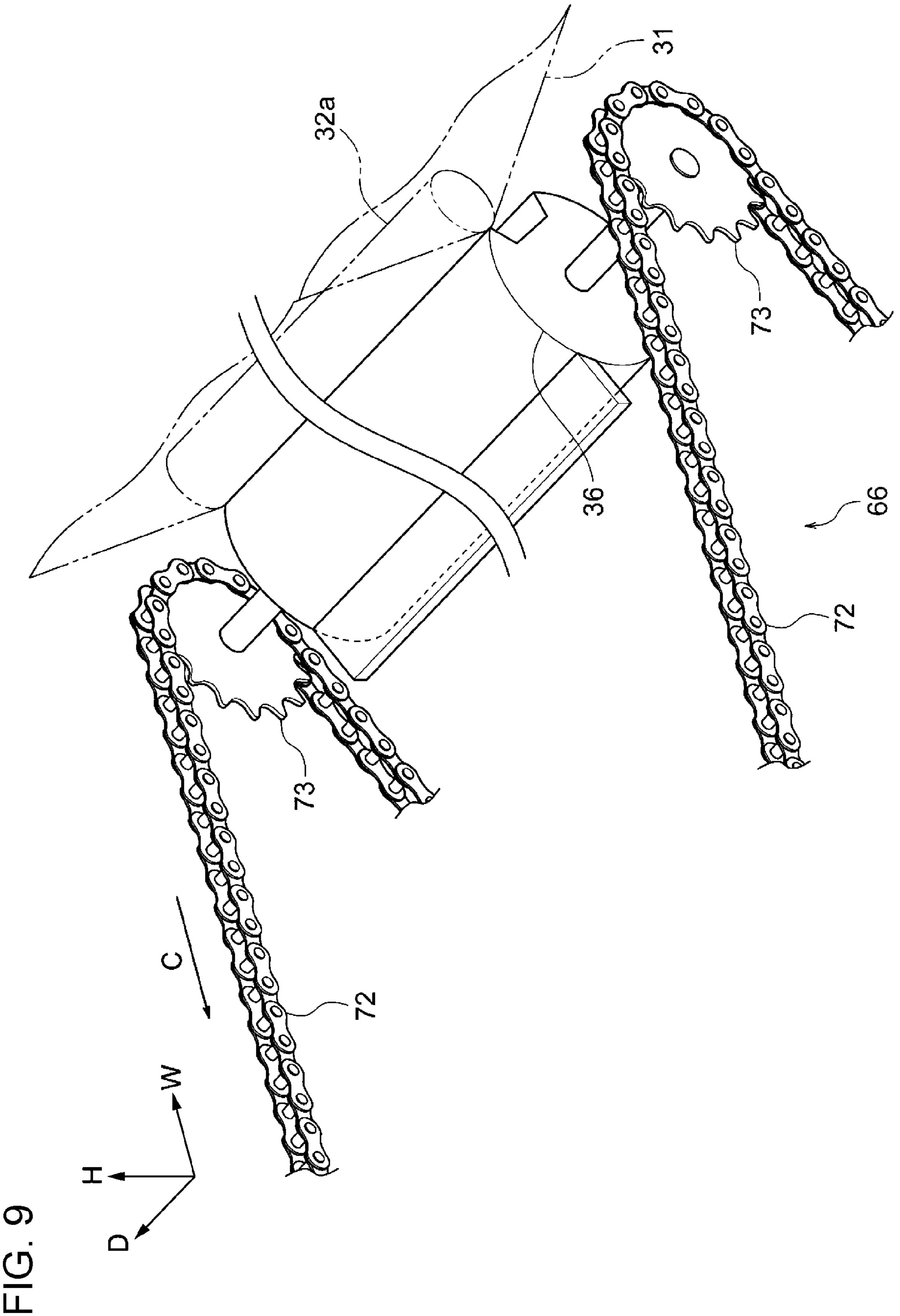
FIG. 9 is a perspective view showing a second transfer roller of the image forming apparatus according to the exemplary embodiment of the present disclosure.

The pressure roller 140 is opposed to the heating roller 130 with the sheet member P that is being transported therebetween. The pressure roller 140 comes into contact with the lower side of the sheet member P that is being transported, and extends in the depth direction such that the axial direction thereof is parallel to the depth direction. Furthermore, as shown in FIG. 8, the pressure roller 140 has, in the outer circumferential surface thereof, a recess 140*a* extending in the depth direction. When a sheet member P passes between the pressure roller 140 and the heating roller 130, the leading-end holding part 68 gripping the leading end of the sheet member P is accommodated in the recess 140*a*.

As shown in FIG. 7, a pair of shafts 148 having a smaller diameter than the pressure roller 140 and extending in the axial direction are formed at both ends of the pressure roller 140 in the depth direction.

The heater 120 includes a pair of support members 156 for supporting the pressure roller 140, and urging members 158 for urging the pressure roller 140 toward the heating roller 130 with the support members 156 therebetween. The support members 156 are disposed so as to rotatably support the pair of shafts 148 of the pressure roller 140 from below.

In this configuration, the urging members 158 urge the pressure roller 140 toward the heating roller 130, so that the pressure roller 140 presses the sheet member P against the heating roller 130. Furthermore, the pressure roller 140 is rotated by receiving a rotational force transmitted from a driving member (not shown). The rotating pressure roller 140 rotates the heating roller 130, and the rotating heating roller 130 rotates the driven roller 150. As a result of the heating roller 130 and the pressure roller 140 nipping and transporting a sheet member P to which a toner image has been transferred, the toner image is heated and fixed to the sheet member P.

Paper Output Mechanism 56 and Output Part 52

The paper output mechanism 56 discharges the sheet member P, sent out from the send-out position SE in the image forming unit 12, from a discharge port provided in the side surface of the housing 14*b* near the housing 14*a*. In this exemplary embodiment, the paper output mechanism 56 transports the sheet member P sent out from the send-out position SE in the image forming unit 12 to the output part 52 provided outside the housing 14*a*.

Figure 1:
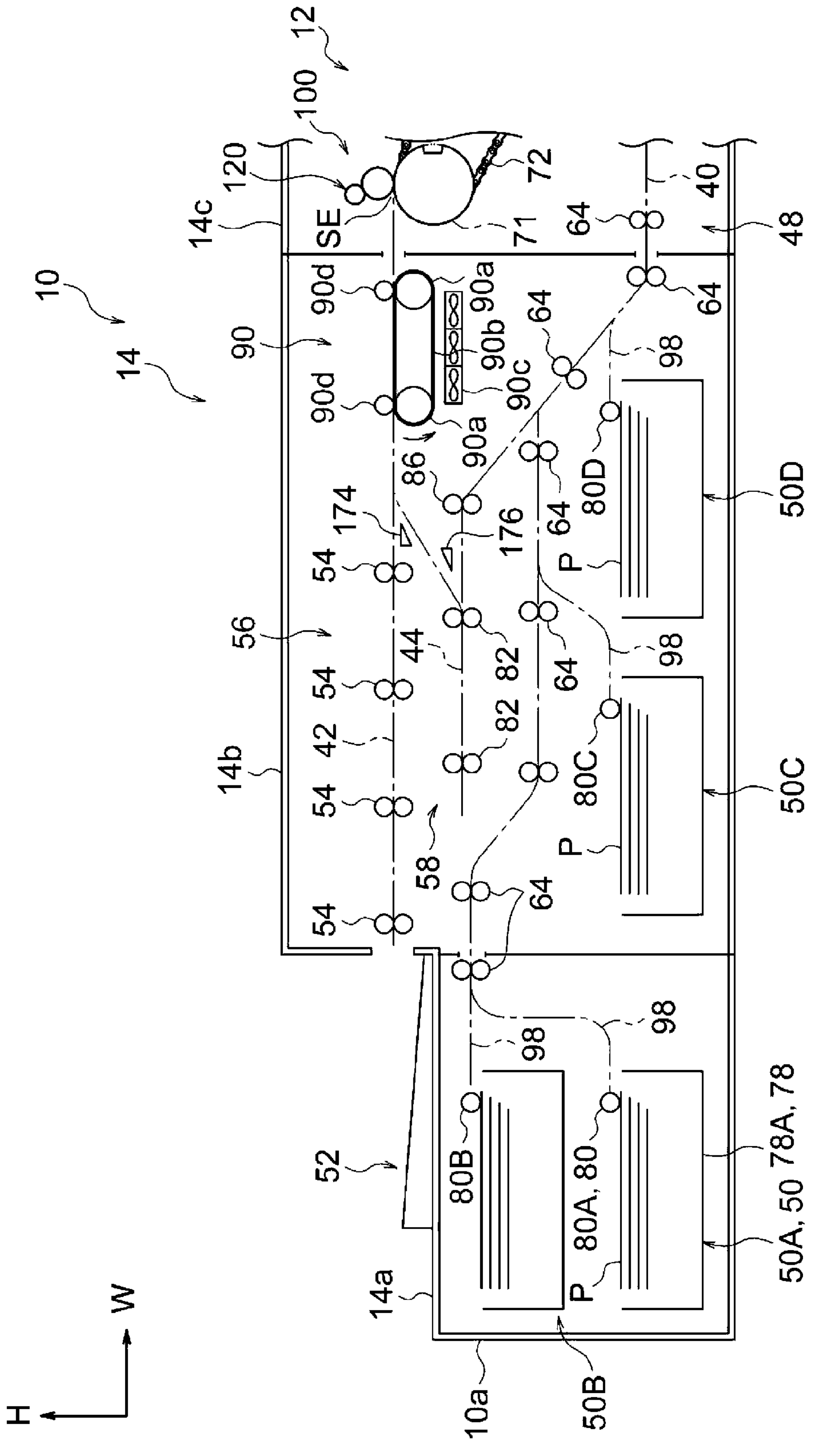
FIG. 1 is a side view showing a paper feed mechanism, a paper output mechanism, and the like of an image forming apparatus according to an exemplary embodiment of the present disclosure.

More specifically, as shown in FIG. 1, the paper output mechanism 56 includes multiple transport rollers 54 for transporting a sheet member P along the discharge path 42, and a cooling unit 90 for cooling the sheet member P while transporting the sheet member P along the discharge path 42. The paper output mechanism 56 will be described in detail below.

The sheet member P transported by the paper output mechanism 56 is output on the output part 52. As shown in FIG. 1, the output part 52 is disposed outside the housing 14*a*, above the two vertically stacked storage parts 50.

Reversing Mechanism 58

The reversing mechanism 58 switches the top surface and back surface of the sheet member P. As shown in FIG. 1, the reversing mechanism 58 includes multiple changing rollers 82 for transporting the sheet member P along a reversing path 44, and a transport roller 86. The reversing mechanism 58 will be described in detail below.

Operation of Image Forming Apparatus

In the image forming apparatus 10 shown in FIG. 13, a toner image is formed on a sheet member P as follows. First, the chargers 22 corresponding to the respective colors, shown in FIG. 12, uniformly and negatively charge the surfaces of the photoconductor drums 21 corresponding to the respective colors to a predetermined electric potential. Next, the exposure devices 23 radiate the exposure light on the surfaces of the charged photoconductor drums 21 on the basis of externally input image data to form electrostatic latent images.

As a result, the electrostatic latent images corresponding to the image data are formed on the surfaces of the photoconductor drums 21. The developing devices 24 corresponding to the respective colors develop the electrostatic latent images into visible toner images. Furthermore, the first transfer rollers 33 of the transfer device 30, as shown in FIG. 2, transfer the toner images formed on the surfaces of the photoconductor drums 21 to the transfer belt 31 at the first transfer positions T.

A sheet member P sent out from a storage part 50 (see FIG. 13) to the feed path 40 by the feed-out roller 80 is transported by the transport rollers 64 and is passed to a leading-end holding part 68 of the chain gripper 66 at the receiving position RE, shown in FIG. 3, to be transported. The sheet member P is transported toward the second transfer position NT by the chain gripper 66. At the second transfer position NT, the sheet member P is nipped and transported between the transfer belt 31 and the second transfer roller 36, and thus, the toner image on the surface of the transfer belt 31 is transferred to the surface of the sheet member P.

The fixing device 100 fixes the toner image transferred to the top surface of the sheet member P to the sheet member P, and the sheet member P transported by the chain gripper 66 is sent out to the discharge path 42 at the send-out position SE. The sheet member P sent out to the discharge path 42, as shown in FIG. 1, is cooled by being transported by the cooling unit 90 and is transported by the transport rollers 54. The sheet member P is then discharged onto the output part 52 outside the housing 14*a*.

When a toner image is to be formed on the back surface of a sheet member P, the sheet member P that has passed through the cooling unit 90 is sent out the reversing path 44 from an intermediate portion of the discharge path 42 and is transported along the reversing path 44. This way, the sheet member P is reversed. The reversed sheet member P is fed to an intermediate portion of the feed path 40. Then, the above-described process is performed again to form a toner image on the back surface of the sheet member P.

Relevant Part Configuration

Next, the paper feed mechanism 48, the paper output mechanism 56, the reversing mechanism 58, and the like will be described.

Paper Feed Mechanism 48

The paper feed mechanism 48 transports a sheet member P accommodated in a storage part 50 to the receiving position RE of the image forming unit 12. As shown in FIGS. 1 and 13, the paper feed mechanism 48 is disposed to one side (left side) of the receiving position RE in the image forming unit 12 in the width direction.

Furthermore, the paper feed mechanism 48 includes multiple transport rollers 64 for transporting the sheet member P along the feed path 40, along which a sheet member P transported to the receiving position RE from the storage part 50 passes. The transport rollers 64 are an example of a first transport part. The transport rollers 64 are disposed in the housings 14*a*, 14*b*, and 14*c*.

Feed Path 40

As shown in FIGS. 1 and 13, the feed path 40 is a path along which a sheet member P transported to the receiving position RE from a storage part 50 passes and is a path extending from one side toward the other side in the width direction (horizontal direction) while changing the position thereof in the top-bottom direction. In other words, the feed path 40 extends in the width direction such that a sheet member P is transported from one side toward the other side in the width direction by the transport rollers 64. In still other words, the feed path 40 extends from one side toward the other side in the width direction of the image forming apparatus 10 so as to pass the sheet member P to the image forming unit 12 from one side in the width direction, at the receiving position RE. More specifically, there are two portions of the feed path 40, namely, a portion extending from the storage parts 50A and 50B in the housing 14*a* and a portion extending from the storage parts 50C and 50D in the housing 14*b*. The two portions of the feed path 40 join into one in the housing 14*b* and extend to the receiving position RE in the image forming unit 12 in the housing 14*c*. More specifically, the feed path 40 is disposed in the housing 14*a*, the housing 14*b*, and the housing 14*c*. In other words, the portion of the feed path 40 extending from the storage parts 50C and 50D is disposed in the housings 14*b* and 14*c*, and the portion of the feed path 40 extending from the storage parts 50A and 50B in the housing 14*a* is disposed in the housings 14*a*, 14*b*, and 14*c*. In still other words, a portion of the feed path 40 is disposed in the housing 14*a*, another portion of the feed path 40 is disposed in the housing 14*b*, and another portion of the feed path 40 is disposed in the housing 14*c*.

In this exemplary embodiment, the feed path 40 extends from one side toward the other side in the width direction without changing the transport direction vertically upward or downward at an intermediate portion of the feed path 40. The feed path 40 has a portion that does not overlap the image forming unit 12, in particular, the fixing device 100, in the vertical direction on the upstream side in the sheet transport direction. Specifically, this upstream portion of the feed path 40 in the sheet transport direction is an example of a portion of the feed path extending toward one side beyond the image forming unit. A portion of the feed path 40 on other side, extending from one side toward the other side in the width direction, that is, the portion near the image forming unit 12, overlaps the image forming unit 12, in particular, the fixing device 100, in the vertical direction.

The "feed path" as used herein is a transport path along which a sheet member P transported to the receiving position RE from a storage part 50 passes and along which the sheet member P is transported until the sheet member P is passed to any of the components of the image forming unit 12.

In this configuration, the feed-out roller 80 of a storage part 50 feeds the top sheet member P of the sheet members P loaded in the loading part 78 to the feed path 40 through the feed-out path 98. The multiple transport rollers 64 transport the sheet member P fed to the feed path 40 to the receiving position RE.

Paper Output Mechanism 56

The paper output mechanism 56 transports the sheet member P sent out from the send-out position SE in the image forming unit 12 to the output part 52 provided outside the housing 14*a*. As shown in FIG. 1, the paper output mechanism 56 is disposed to one side (left side) in the width direction of the send-out position SE in the image forming unit 12. More specifically, the paper output mechanism 56 is disposed in the housing 14*b*.

Furthermore, the paper output mechanism 56 includes multiple transport rollers 54 for transporting a sheet member P along the discharge path 42, along which the sheet member P transported from the send-out position SE to the output part 52 passes, and the cooling unit 90 for cooling the sheet member P while transporting. The cooling unit 90 and the multiple transport rollers 54 are arranged in this order from the upstream side to the downstream side in the sheet transport direction.

Discharge Path 42

The discharge path 42 is a path along which a sheet member P transported from the send-out position SE in the image forming unit 12 toward the output part 52 provided outside the housing 14*a* passes, and extends from the other side toward one side in the width direction (horizontal direction). In other words, the discharge path 42 extends in the width direction so as to transport the sheet member P from the other side toward one side in the width direction. In still other words, the discharge path 42 extends from the other side toward one side in the width direction from the send-out position SE, at which the discharge path 42 receives the sheet member P. More specifically, the discharge path 42 extends from the send-out position SE in the housing 14*c* toward the housing 14*b* in the width direction. Specifically, the discharge path 42 is disposed in the housing 14*b* and the housing 14*c*. In other words, a portion of the discharge path 42 is disposed in the housing 14*a*, and a portion of the discharge path 42 is disposed in the housing 14*b*.

In this exemplary embodiment, the discharge path 42 extends from the other side toward one side in the width direction without changing the transport direction vertically upward or downward at an intermediate portion.

Furthermore, the discharge path 42 is disposed above the feed path 40 in the top-bottom direction (vertical direction), and the discharge path 42 and the feed path 40 at least partially overlap each other in the top-bottom direction. Furthermore, the discharge path 42 is disposed above the storage parts 50C and 50D accommodating sheet members P in the top-bottom direction. In other words, the storage parts 50C and 50D are disposed below the discharge path 42 in the top-bottom direction. The discharge path 42 is provided at a position not overlapping the fixing device 100 in the vertical direction. In other words, the discharge path 42 is disposed at a position shifted from the image forming unit 12 in the horizontal direction so as not to overlap the image forming unit 12 in the vertical direction. More specifically, the discharge path 42 has a portion extending toward one side in the width direction beyond the image forming unit 12.

Herein, the "discharge path" is a transport path along which a sheet member P to which a toner image has been formed is discharged to the outside of the housing 14*a* passes and is a transport path along which the sheet member P that has been sent out from any of the components of the image forming unit 12 passes before being discharged to the output part 52.

Cooling Unit 90 and Transport Roller 54

As shown in FIG. 1, the cooling unit 90 is disposed along the discharge path 42 so as to receive the sheet member P to which a toner image has been fixed by the fixing device 100.

Figure 11:
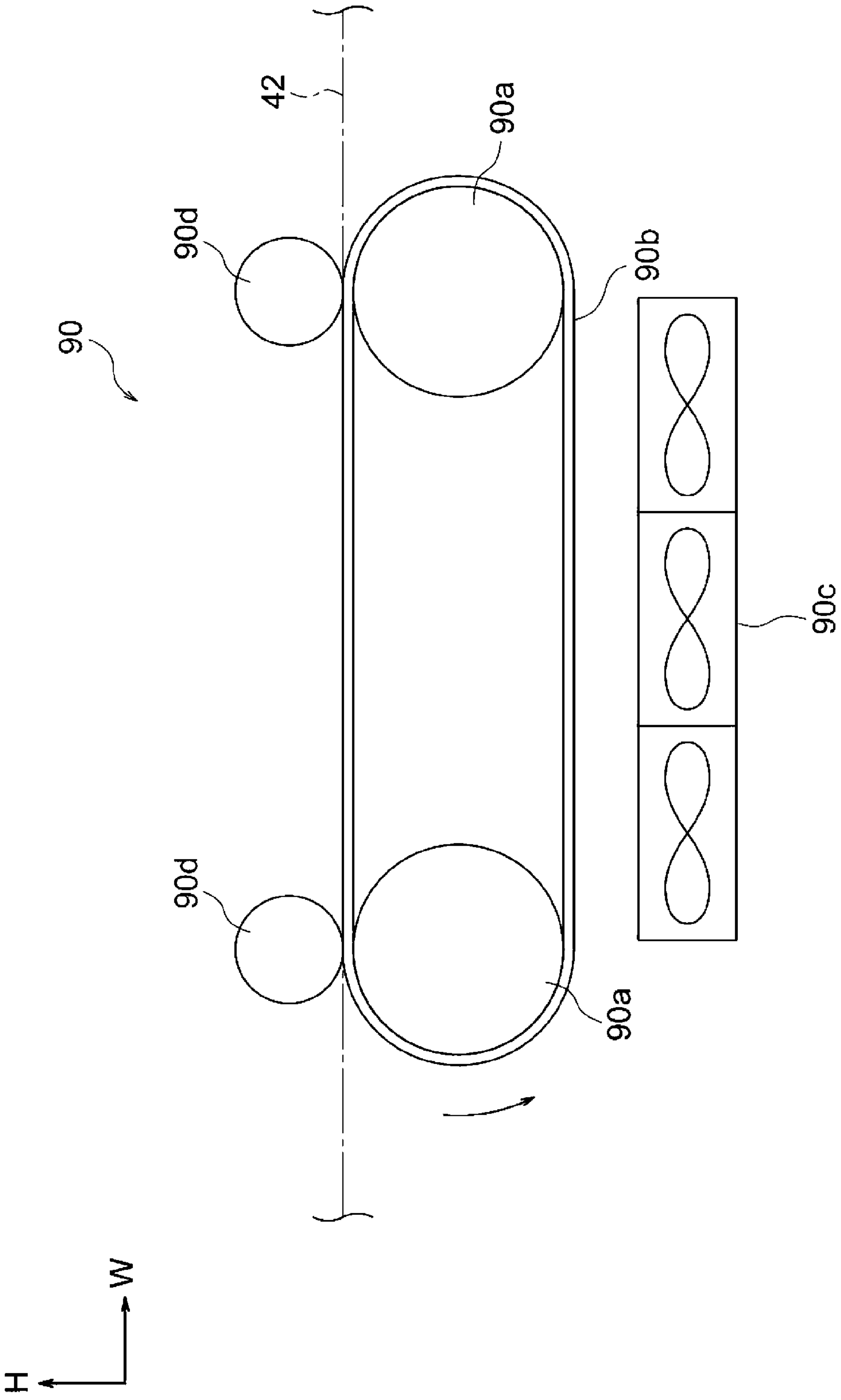
FIG. 11 is a side view showing a cooling unit of the image forming apparatus according to the exemplary embodiment of the present disclosure.

As shown in FIG. 11, the cooling unit 90 includes two rollers 90*a* arranged side-by-side in the width direction and an endless belt 90*b* stretched over the two rollers 90*a*. The top surface of the endless belt 90*b* extends along the discharge path 42. The cooling unit 90 also includes a cooling fan 90*c* that blows air at the lower surface of the belt 90*b* to cool down the belt 90*b*, and rollers 90*d* opposed to the two rollers 90*a* with the discharge path 42 and the belt 90*b* therebetween. The cooling unit 90 is an example of a second transport part.

As shown in FIG. 1, multiple transport rollers 54 are provided along the discharge path 42, on the downstream side of the cooling unit 90 in the sheet transport direction. The transport rollers 54 are an example of the second transport part.

In this configuration, one of the two rollers 90*a* receives a rotational force from a driving member (not shown) and rotates. As a result, the belt 90*b* cooled by the cooling fan 90*c* revolves in the direction indicated by the arrow (counterclockwise), rotating the rollers 90*d* in a driven manner. The revolving belt 90*b* and the rollers 90*d* rotated by the belt 90*b* nip and transport the sheet member P. As a result, the sheet member P is cooled. Then, the cooling unit 90 passes the sheet member P to the transport rollers 54, and the transport rollers 54 transport the sheet member P along the discharge path 42 and discharge the sheet member P onto the output part 52.

Reversing Mechanism 58

The reversing mechanism 58 receives the sheet member P transported along the discharge path 42 from an intermediate portion of the discharge path 42, reverses the sheet member P, and then guides the sheet member P to the intermediate portion of the feed path 40. As shown in FIG. 1, the reversing mechanism 58 is disposed to one side (left side) of the image forming unit 12 in the width direction, between the paper feed mechanism 48 and the paper output mechanism 56 in the top-bottom direction. The reversing mechanism 58 is disposed in the housing 14*b*.

The reversing mechanism 58 includes: the changing rollers 82 and the transport roller 86, which transport the sheet member P along the reversing path 44, which is split from the discharge path 42 at an intermediate portion thereof and joins the feed path 40 at an intermediate portion thereof; a switching member 174; and a guide member 176. The changing rollers 82 and the transport roller 86 are an example of the third transport part.

Reversing Path 44

Figure 4:
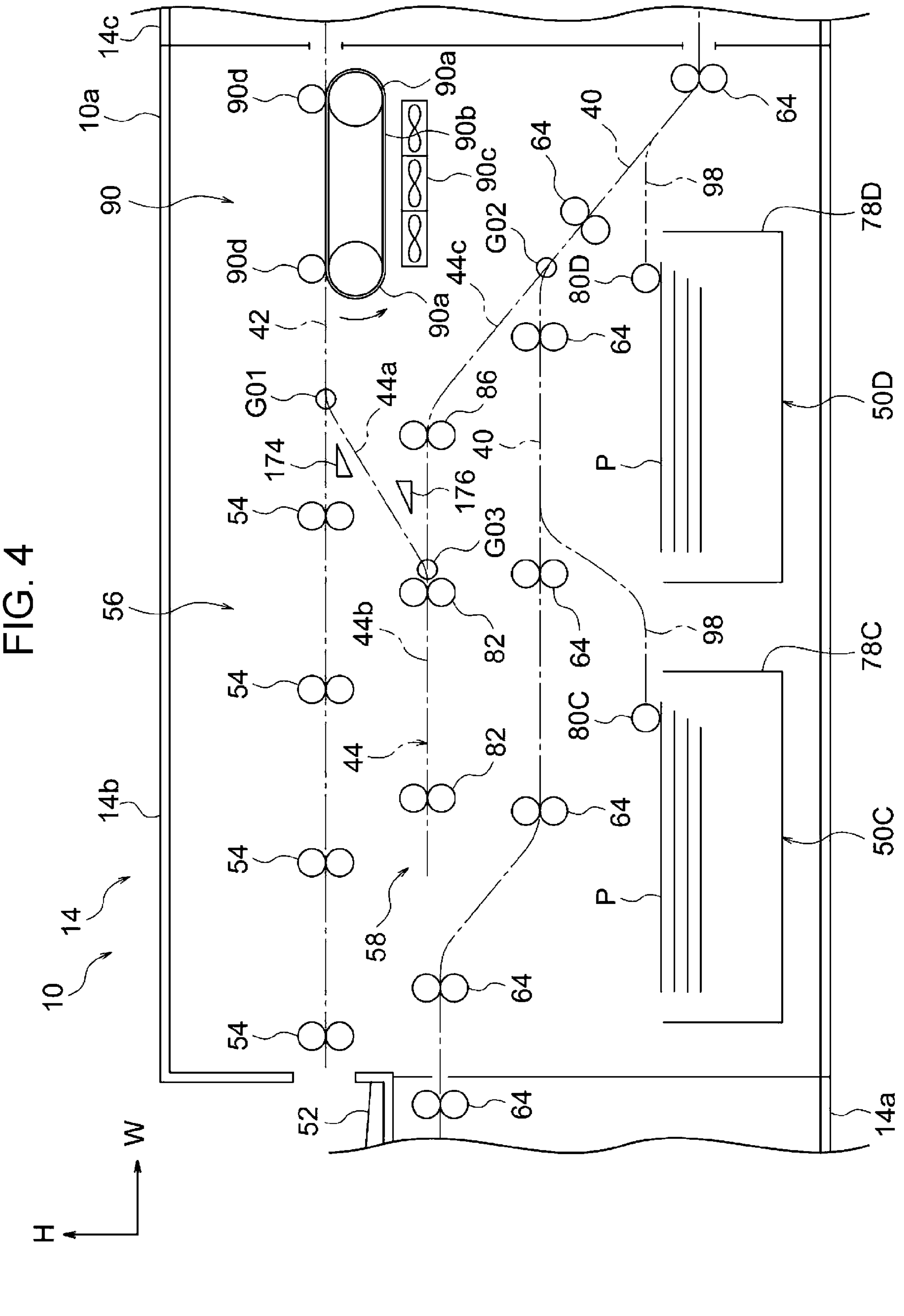
FIG. 4 is a side view showing a feed path in the paper feed mechanism, a discharge path in the paper output mechanism, and the like of the image forming apparatus according to the exemplary embodiment of the present disclosure.

As shown in FIG. 4, the reversing path 44 includes: a branch path 44*a* that is split from the discharge path 42 at a portion (G01 in FIG. 4) on the downstream side of the cooling unit 90 in the sheet transport direction and that extends from the other side toward one side in the width direction; a changing path 44*b* extending from the other side toward one side in the width direction from the end of the branch path 44*a* and in which the sheet transport direction is reversed; and a joining path 44*c* extending from one side toward the other side in the width direction from the end of the changing path 44*b* separately from the branch path 44*a* and joining an intermediate portion (G02 in FIG. 4) of the feed path 40. The reversing path 44 is disposed in the housing 14*b*.

In this exemplary embodiment, the reversing path 44 extends in the width direction without changing the transport direction upward or downward at an intermediate portion. The position of the changing path 44*b* of the reversing path 44 in the vertical direction is lower than that of the image forming unit 12. More specifically, the changing path 44*b* is disposed below the top of the image forming unit 12 in the vertical direction. Furthermore, the feed path 40, the discharge path 42, and the reversing path 44 are disposed so as to overlap one another in the vertical direction, without overlapping the image forming unit 12 in the vertical direction. In other words, a portion of the feed path 40 extending toward one side beyond the image forming unit 12, a portion in the discharge path 42 extending toward one side beyond the image forming unit 12, and the third transport part overlap one another in the vertical direction, at a position shifted from the image forming unit 12 in the horizontal direction.

Herein, the "reversing path 44" is a transport path in which a sheet member P to be fed to the feed path 40 is reversed and is a transport path that is split from the discharge path 42 at an intermediate portion thereof and joins the feed path 40 at an intermediate portion thereof.

Changing Roller 82 and Transport Roller 86

As shown in FIG. 4, there are two changing rollers 82 disposed at the ends of the changing path 44*b*. The two changing rollers 82 receive a sheet member P transported from the branch path 44*a* to the changing path 44*b* and reverses the transport direction of the sheet member P. More specifically, the changing rollers 82 receive the sheet member P transported from the branch path 44*a* to the changing path 44*b* while rotating in one direction, and then rotate in the other direction to send out the sheet member P from the branch path 44*a* to the joining path 44*c*.

The transport roller 86 is disposed in the joining path 44*c*. The transport roller 86 receives the sheet member P transported in the opposite direction and sent out from the changing path 44*b* to the joining path 44*c*, and sends out the sheet member P to the intermediate portion of the feed path 40.

Switching Member 174 and Guide Member 176

As shown in FIG. 4, the switching member 174 is disposed at a portion where the branch path 44*a* is split from the discharge path 42 at the intermediate portion thereof (G01 in FIG. 4). The switching member 174 determines whether the sheet member P cooled by the cooling unit 90 is transported along the discharge path 42 or is fed to the branch path 44*a*.

The guide member 176 is disposed at a portion (G03 in FIG. 4) where the changing path 44*b* and the joining path 44*c* join. The guide member 176 guides the sheet member P, whose transport direction has been reversed in the changing path 44*b*, toward the joining path 44*c*.

In this configuration, when a toner image is to be formed on the back surface of a sheet member P having a toner image on the top surface thereof, the switching member 174 guides the sheet member P transported along the discharge path 42 with the toner image formed on the top surface thereof from the intermediate portion of the discharge path 42 to the branch path 44*a*. The changing rollers 82 receive the sheet member P transported from the branch path 44*a* to the changing path 44*b* while rotating in one direction, and then rotate in the other direction to reverse the sheet transport direction. More specifically, when the changing rollers 82 rotating in one direction rotate in the other direction, the changing rollers 82 rotating in one direction temporarily stop and then rotate in the other direction. In other words, after the transportation of the sheet member P is stopped in the changing path 44*b*, the sheet transport direction is reversed.

The guide member 176 guides the sheet member P, whose transport direction has been reversed in the changing path 44*b*, to the joining path 44*c*. The transport roller 86 receives the sheet member P transported from the changing path 44*b* to the joining path 44*c* and guides the sheet member P to the intermediate portion of the feed path 40.

Other Configurations

The image forming apparatus 10 includes measurement parts 180 for measuring the dimensions of the sheet member P stopped in the changing path 44*b*. In this exemplary embodiment, when the trailing end of the sheet member P has passed through the branch path 44*a*, the transportation of the sheet member P is stopped.

Figure 5:
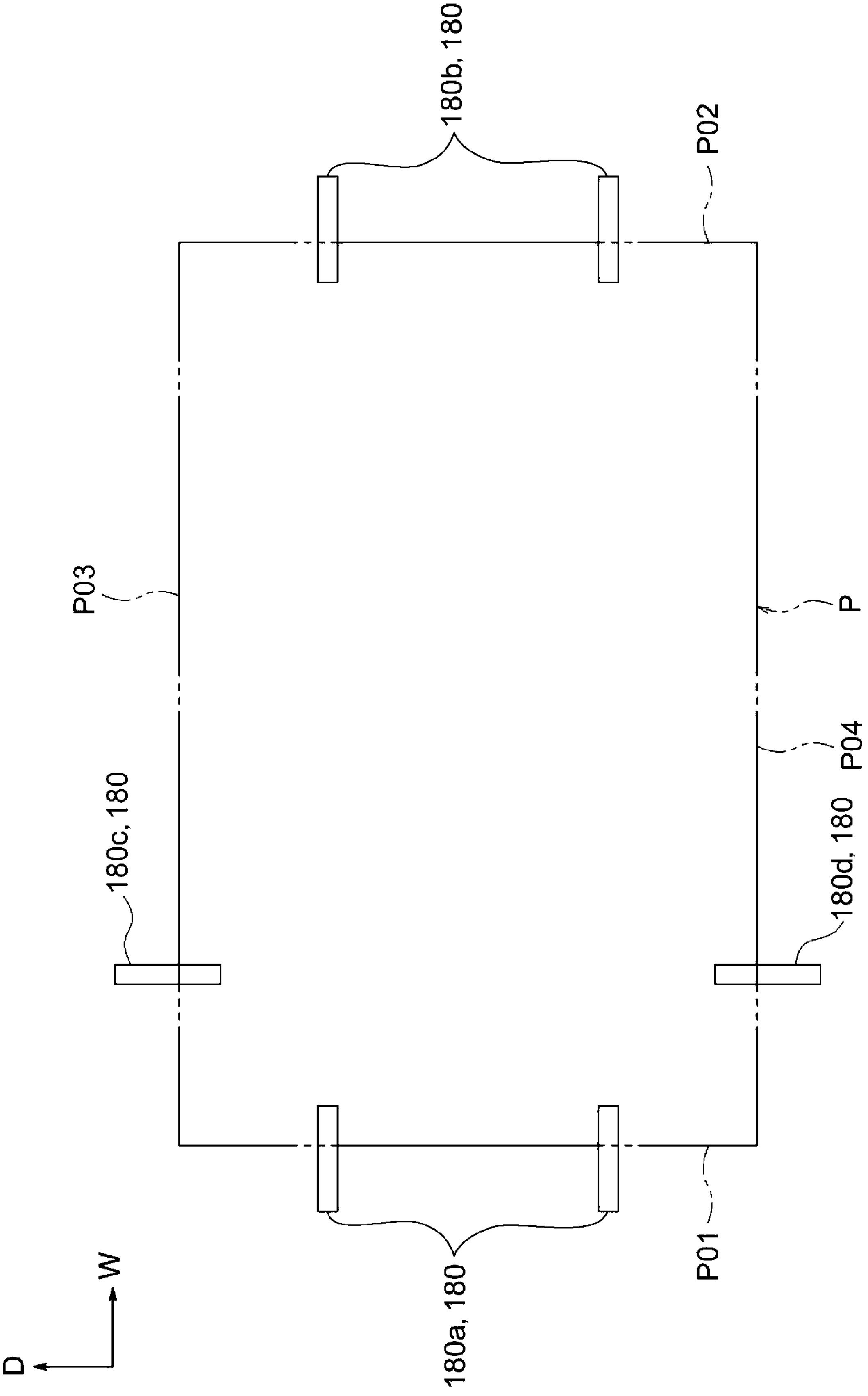
FIG. 5 is a plan view showing a measurement part of the image forming apparatus according to the exemplary embodiment of the present disclosure.

As shown in FIG. 5, the measurement parts 180 include a pair of detection parts 180*a* for detecting the position of a leading edge P01 of a sheet member P that has been stopped, a pair of detection parts 180*b* for detecting the position of a trailing end P02 of the sheet member P, a detection part 180*c* for detecting the position of one side edge P03 of the sheet member P, and a detection part 180*d* for detecting the position of the other side edge P04 of the sheet member P.

The detection parts 180*a*, 180*b*, 180*c*, and 180*d* are known optical sensors. The pair of detection parts 180*a* are arranged side-by-side in the depth direction, and the pair of detection parts 180*b* are arranged side-by-side in the depth direction.

In this configuration, the measurement parts 180 measure the dimensions of a sheet member P on the basis of the detection results obtained by the detection parts 180*a*, 180*b*, 180*c*, and 180*d*. The controller 18 adjusts the position of a toner image to be transferred to the sheet member P such that the distances between the edges of the toner image and the edges of the sheet member P are the same across all the edges.

Operation of Relevant Part Configuration

Next, the operation of the relevant part configuration will be described in comparison with an image forming apparatus 510 according to a comparison example. First, the configuration of the image forming apparatus 510 according to the comparison example will be described below, focusing on the difference from the image forming apparatus 10.

Image Forming Apparatus 510

Figure 15:
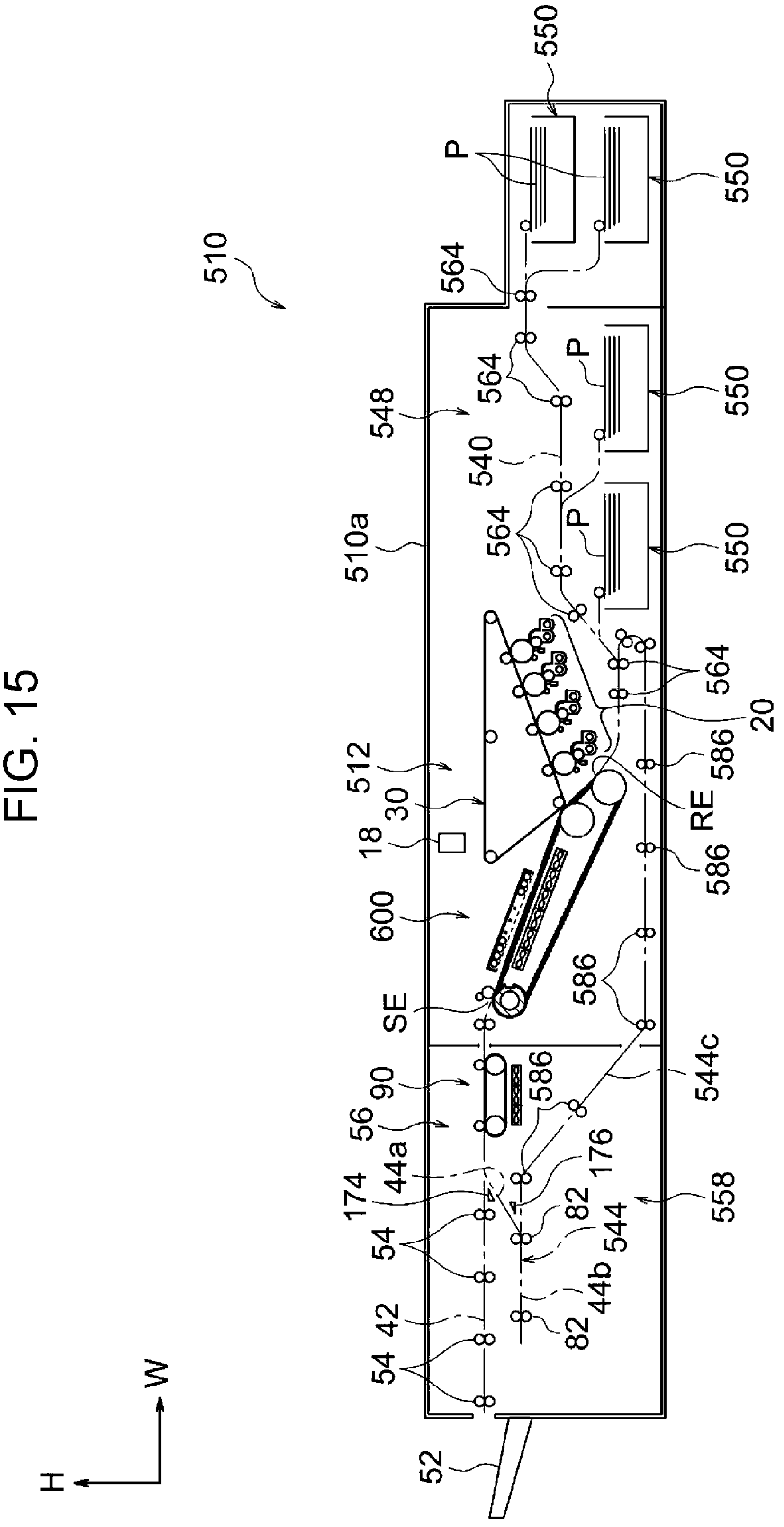
FIG. 15 schematically shows the configuration of the image forming apparatus according to the comparison example to the exemplary embodiment of the present disclosure.

As shown in FIG. 15, the image forming apparatus 510 includes storage parts 550, a paper feed mechanism 548, an image forming unit 512, the paper output mechanism 56, the output part 52, and a reversing mechanism 558.

Storage Part 550

As shown in FIG. 15, the storage parts 550 are disposed to the other side of the image forming unit 512 in the width direction. The image forming apparatus 510 includes four storage parts 550. Three storage parts 550 are disposed side-by-side in the width direction, and one storage part 550 is disposed above the storage part 550 that is located to the extreme other side (right side) in the width direction, among the three storage parts 550.

Paper Feed Mechanism 548

As shown in FIG. 15, the paper feed mechanism 548 is disposed to the other side (right side) of the receiving position RE in the image forming unit 512 in the width direction.

Furthermore, the paper feed mechanism 548 includes multiple transport rollers 564 for transporting a sheet member P along the feed path 540, along which a sheet member P transported to the receiving position RE passes. The feed path 540 extends from the other side toward one side in the width direction. In other words, the feed path 540 extends from the other side toward one side in the horizontal direction.

Image Forming Unit 512

Figure 14:
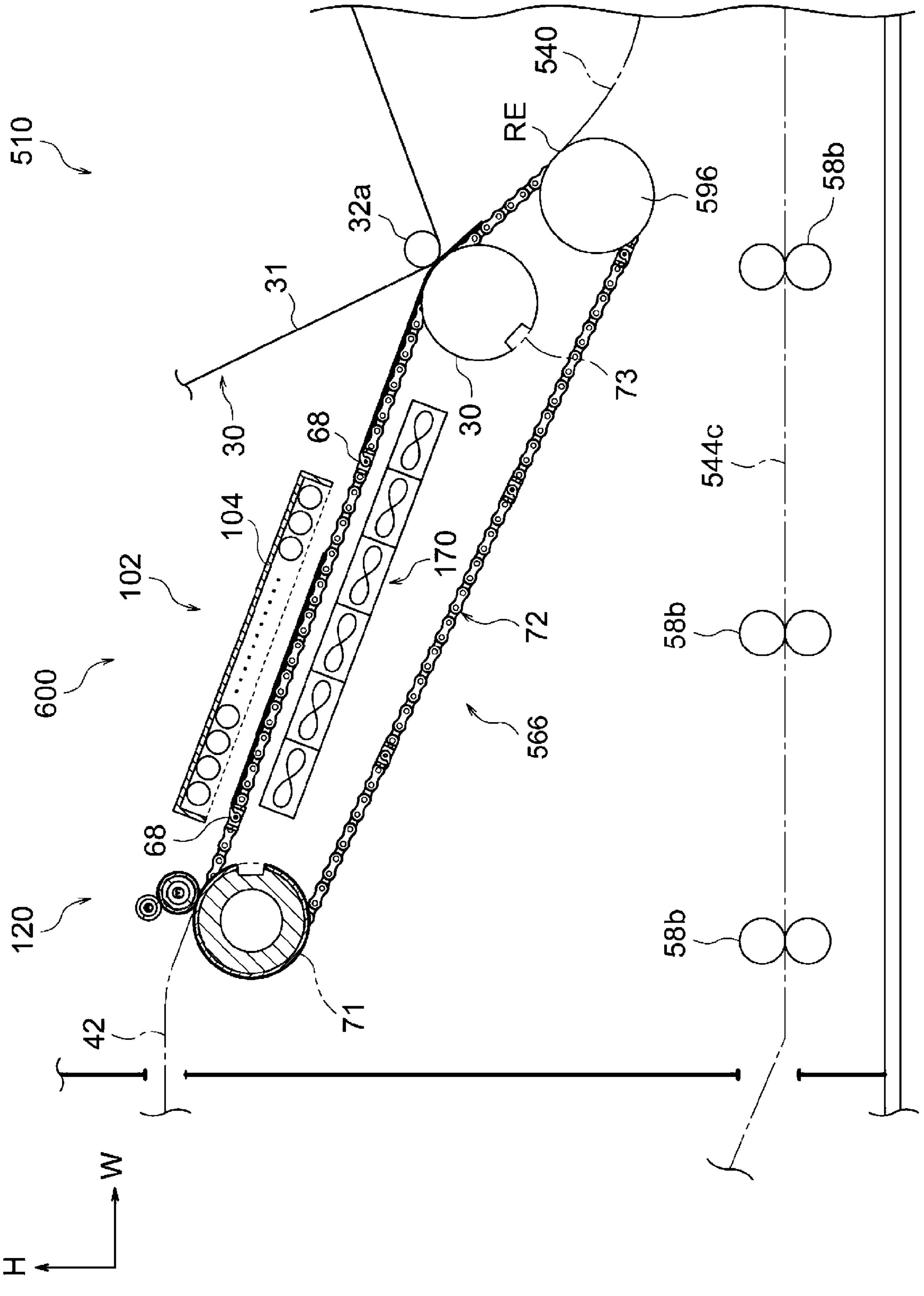
FIG. 14 is a side view showing a fixing device of an image forming apparatus according to a comparison example to the exemplary embodiment of the present disclosure.

The image forming unit 512 includes the toner-image forming units 20, the transfer device 30, and a fixing device 600. As shown in FIG. 14, the fixing device 600 includes a chain gripper 566, the preheater 102, the heater 120, and the blowing unit 170. The chain gripper 566 includes the pair of chains 72, the leading-end holding parts 68 that hold the leading ends of sheet members P, and pairs of sprockets 71, 73, and 596. The sprockets 596 are disposed below the sprockets 73 and to the other side of the sprockets 73 in the width direction.

In this configuration, when a leading-end holding part 68 attached to the chains 72 reaches the receiving position RE on the upper side of the sprockets 596, the grippers 76 of the leading-end holding part 68 grip the leading end of a sheet member P that has been transported by the transport rollers 564 along the feed path 540, thus receiving and holding the sheet member P.

Reversing Mechanism 558

As shown in FIG. 15, the reversing mechanism 558 includes the changing rollers 82, transport rollers 586, the switching member 174, and the guide member 176, which transport a sheet member P along a reversing path 544.

The reversing path 544 includes the branch path 44*a*, the changing path 44*b*, and a joining path 544*c*. The joining path 544*c* extends from one side toward the other side in the width direction from an end of the changing path 44*b*, separately from the branch path 44*a*, and joins the intermediate portion of the feed path 540.

Operation of Image Forming Apparatuses 10 and 510

In the image forming apparatus 510 shown in FIG. 15, the transport rollers 564 of the paper feed mechanism 548, which is disposed to the other side of the receiving position RE in the image forming unit 512 in the width direction, transport a sheet member P along the feed path 540. More specifically, the multiple transport rollers 564 transport a sheet member P from a storage part 550, which is disposed to the other side of the image forming unit 512 in the width direction, toward the receiving position RE.

In contrast, in the image forming apparatus 10 as shown in FIG. 13, the transport rollers 64 of the paper feed mechanism 48, which is disposed to one side of the receiving position RE in the image forming unit 12 in the width direction, transport a sheet member P along the feed path 40. More specifically, the transport rollers 64 transport a sheet member P from a storage part 50, which is disposed to one side of the image forming unit 12 in the width direction, toward the receiving position RE in the image forming unit 12.

The image forming unit 12, 512 forms a toner image on the surface of a sheet member P received at the receiving position RE and sends out the sheet member P from the send-out position SE to the discharge path 42.

The cooling unit 90 and the multiple transport rollers 54 of the paper output mechanism 56, which is disposed to one side of the send-out position SE in the width direction, transport the sheet member P along the discharge path 42 and discharge the sheet member P onto the output part 52.

When a toner image is to be formed on the back surface of a sheet member P having a toner image formed on the top surface thereof, the switching member 174 guides the sheet member P, which is being transported along the discharge path 42, from the intermediate portion of the discharge path 42 to the branch path 44*a*. The changing rollers 82 receive the sheet member P guided from the branch path 44*a* to the changing path 44*b* while rotating in one direction and then rotate in the other direction to reverse the sheet transport direction. More specifically, when the changing rollers 82 rotating in one direction rotate in the other direction, the rotation of the changing rollers 82 rotating in one direction temporarily stops, and then the changing rollers 82 rotate in the other direction. Hence, the sheet transport direction is reversed after the transportation of the sheet member P is stopped in the changing path 44*b*.

Furthermore, the guide member 176 guides the sheet member P, whose transport direction has been reversed in the changing path 44*b*, to the joining path 44*c*, 544*c*. The transport roller 86, 586 receives the sheet member P transported from the changing path 44*b* to the joining path 44*c*, 544*c*, transports the sheet member P along the joining path 44*c*, 544*c*, and feeds the sheet member P to the intermediate portion of the feed path 40, 540. By performing the image forming process again, a toner image is formed on the back surface of the sheet member P.

Furthermore, the cooling unit 90 of the paper output mechanism 56 and the multiple transport rollers 54 transport the sheet member P along the discharge path 42 and discharge the sheet member P onto the output part 52.

The measurement parts 180 shown in FIG. 5 measure the dimensions of the sheet member P that has been stopped in the changing path 44*b* of the reversing path 44. The controller 18 controls the image forming unit 12, 512 to adjust the position of a toner image to be transferred to the sheet member P on the basis of the measurement results obtained by the measurement parts 180. More specifically, the controller 18 controls the position of a toner image to be transferred to the sheet member P such that the distances between the edges of the toner image and the edges of the sheet member P are the same across all the edges.

As described above, in the image forming apparatus 510, the paper feed mechanism 548 is disposed to the other side of the receiving position RE in the image forming unit 512 in the width direction. The feed path 540, along which a sheet member P transported to the receiving position RE in the image forming unit 512 passes, extends from the other side toward one side in the width direction. In contrast, in the image forming apparatus 10, the paper feed mechanism 48 is disposed to one side of the receiving position RE in the image forming unit 12 in the width direction. The feed path 40, along which a sheet member P transported to the receiving position RE in the image forming unit 12 passes, extends from one side toward the other side in the width direction.

Furthermore, in the image forming apparatuses 10 and 510, the paper output mechanism 56 is disposed to one side of the send-out position SE in the image forming unit 12 in the width direction. The discharge path 42, along which a sheet member P transported to the output part 52 passes, extends from the other side toward one side in the width direction. In the image forming apparatus 510, the feed path 540 and the discharge path 42 are located at a distance from each other in the width direction (see FIG. 15). In other words, the feed path 540 and the discharge path 42 do not overlap each other in the top-bottom direction (vertical direction). In contrast, in the image forming apparatus 10, the discharge path 42 and the feed path 40 at least partially overlap each other in the top-bottom direction (vertical direction).

Accordingly, in the image forming apparatus 10, the feed path 40 and the discharge path 42 occupy a smaller area in the width direction (horizontal direction) than in the image forming apparatus 510.

Furthermore, in the image forming apparatus 10, the discharge path 42 is disposed above the feed path 40 in the top-bottom direction. Hence, compared with a case where the discharge path 42 is disposed below the feed path 40, the position of the output part 52 is high. This enables a user to pick up, in a standing state, the sheet member P from the output part 52.

Furthermore, in the image forming apparatus 10, the storage parts 50C and 50D are disposed below the discharge path 42 in the top-bottom direction. Hence, compared with a case where the storage parts 50C and 50D and the discharge path 42 are located at a distance from each other in the width direction, the storage parts 50C and 50D and the discharge path 42 occupy a small area in the horizontal direction.

Furthermore, in the image forming apparatus 10, the reversing path 44 is disposed between the feed path 40 and the discharge path 42 in the top-bottom direction. Hence, compared with a case where the reversing path 44 and the area between the feed path 40 and the discharge path 42 are located at a distance from each other in the width direction, the area between the feed path 40 and the discharge path 42 is efficiently used.

Furthermore, in the image forming apparatus 10, the measurement parts 180 measure the dimensions of a sheet member P that has been stopped in the changing path 44*b*. Hence, the sheet member P does not need to be stopped only for measuring the dimensions thereof.

Furthermore, in the image forming apparatus 10, the feed path 40, the discharge path 42, and the reversing path 44 are disposed so as to overlap one another in the vertical direction at a position not overlapping the image forming unit 12 in the vertical direction. Hence, compared with a case where the feed path 40, the discharge path 42, the reversing path 44, and the image forming unit 12 are disposed so as to overlap one another in the vertical direction, the height of the body of the image forming apparatus 10 does not increase.

In the image forming apparatus 10, the feed path 40, the discharge path 42, and the reversing path 44 are disposed in the same housing 14*b*. More specifically, the reversing path 44 joins the feed path 40 and the discharge path 42 in the housing 14*b*, in which a portion of the feed path 40 and a portion of the discharge path 42 are disposed. Hence, compared with a case where the reversing path 44 is disposed in a housing other than the housing in which the feed path 40 or the discharge path 42 is accommodated, the adjustment of the reversing path 44 at the time of installing the image forming apparatus 10 is simple.

In the image forming apparatus 10, the changing path 44*b* is disposed below the top of the image forming unit 12 in the vertical direction. Hence, the height of the body of the image forming apparatus 10 does not increase, compared with a case where the changing path 44*b* is disposed above the top of the image forming unit 12 in the vertical direction.

In the image forming apparatus 10, the discharge path 42 is disposed at a position shifted from the image forming unit 12 in the horizontal direction such that discharge path 42 does not overlap the image forming unit 12 in the vertical direction. Hence, compared with a case where the feed path 40 and the discharge path 42 overlap the image forming unit 12 in the vertical direction, the height of the body of the image forming apparatus 10 does not increase.

Although a specific exemplary embodiment of the present disclosure has been described in detail above, it is obvious to those skilled in the art that the present disclosure is not limited to the above-described exemplary embodiment, and various modifications, changes, improvements are possible within the scope of the present disclosure. For example, although the cooling unit 90 is provided in the discharge path 42 in the above-described exemplary embodiment, the cooling unit 90 does not need to be provided.

In the above-described exemplary embodiment, although the discharge path 42 is disposed above the feed path 40 in the top-bottom direction, the discharge path 42 may be disposed below the feed path 40. However, in that case, the advantage obtained by disposing the discharge path 42 above the feed path 40 cannot be obtained.

In the above-described exemplary embodiment, the storage parts 50C and 50D are disposed below the discharge path 42 in the top-bottom direction, the storage parts 50C and 50D may be located away from the discharge path 42 in the width direction. However, in that case, the advantage obtained by providing the storage parts 50C and 50D below the discharge path 42 in the top-bottom direction cannot be obtained.

In the above-described exemplary embodiment, the reversing path 44 is disposed between the feed path 40 and the discharge path 42 in the top-bottom direction, the reversing path does not need to be disposed between the feed path and the discharge path. However, in that case, the advantage obtained by disposing the reversing path 44 between the feed path 40 and the discharge path 42 cannot be obtained.

Furthermore, although not specifically described in the above-described exemplary embodiment, two of the transport rollers 64 may function as registration rollers for correcting the orientation of a sheet member P transported.

In the above-described exemplary embodiment, although the sheet member P that is being transported is turned back at the second transfer roller 36, the sheet member P that is being transported may be turned back at, for example, the heater 120 of the fixing device 100.

Furthermore, although the reversing mechanism 58 is provided in the above-described exemplary embodiment, the reversing mechanism 58 does not need to be provided. However, in that case, the advantage obtained by providing the reversing mechanism 58 cannot be obtained.

In the above-described exemplary embodiment, the reversing path 44 is disposed between the feed path 40 and the discharge path 42 in the top-bottom direction and is disposed in the housing 14*b* in which a portion of the feed path 40 and a portion of the discharge path 42 are disposed. However, in the image forming apparatus according to the present disclosure, as long as the reversing path 44 is disposed between the feed path 40 and the discharge path 42 in the top-bottom direction, the reversing path 44 may be disposed in a housing different from the housing in which a portion of the feed path 40 and a portion of the discharge path 42 are disposed. However, in that case, the advantage obtained by disposing the reversing path 44, a portion of the feed path 40, and a portion of the discharge path 42 in the same housing cannot be obtained.

In the above-described exemplary embodiment, the apparatus body 14 includes three housings 14*a*, 14*b*, and 14*c*. However, the apparatus body according to the present disclosure may include two housings, or more than three housings. Furthermore, the apparatus body 14 according to the present disclosure may have a structure in which the components of the image forming apparatus 10 are accommodated in a single housing.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

an apparatus body;

an image forming unit that forms a toner image on a recording medium;

a first transport part that transports the recording medium to the image forming unit along a feed path extending from one side toward an other side in a horizontal direction, the feed path being a path along which the recording medium transported by the first transport part passes, and that includes a portion extending toward the one side beyond the image forming unit;

a second transport part that transports the recording medium from the image forming unit to an outside of the apparatus body along a discharge path extending from the other side toward one side in the horizontal direction and that includes a portion extending toward the one side beyond the image forming unit, the discharge path and the feed path at least partially overlapping each other in a vertical direction; and a third transport part that transports the recording medium along a reversing path splitting from the discharge path at an intermediate portion thereof, extending from the other side toward the one side in the horizontal direction, extending from the one side toward the other side in the horizontal direction, and joining the feed path at an intermediate portion thereof, wherein the reversing path is disposed between the feed path and the discharge path in the vertical direction, and wherein the reversing path includes a changing path in which a recording-medium transport direction is reversed and that is disposed below a top of the image forming unit in the vertical direction.

2. The image forming apparatus according to claim 1, wherein the discharge path is disposed above the feed path in the vertical direction.

3. The image forming apparatus according to claim 2, further comprising a storage part for storing a recording medium to be fed to the feed path, the storage part being disposed below the discharge path in the vertical direction.

4. The image forming apparatus according to claim 1, further comprising a measurement part, wherein:

the third transport part transports the recording medium from the other side toward the one side in the horizontal direction, stops the transportation of the recording medium, and then transports the recording medium from the one side toward the other side in the horizontal direction, and the measurement part measures dimensions of the recording medium stopped by the third transport part.

5. The image forming apparatus according to claim 1, wherein the portion of the feed path extending toward the one side beyond the image forming unit, the portion of the discharge path extending toward the one side beyond the image forming unit, and the third transport part overlap one another in the vertical direction at a position shifted from the image forming unit in the horizontal direction.

6. The image forming apparatus according to claim 5, wherein:

the apparatus body includes a plurality of housings, and the feed path, the discharge path, and the reversing path are disposed in the same housing.

7. The image forming apparatus according to claim 1, wherein the first transport part overlaps the image forming unit in the vertical direction, and the second transport part does not overlap the image forming unit in the vertical direction.

8. An image forming apparatus comprising:

an apparatus body;

an image forming unit that forms a toner image on a recording medium;

a first transport part that transports the recording medium to the image forming unit along a feed path extending from one side toward an other side in a horizontal direction, the feed path being a path along which the recording medium transported by the first transport part passes, and that includes a portion extending toward the one side beyond the image forming unit;

a second transport part that transports the recording medium from the image forming unit to an outside of the apparatus body along a discharge path extending from the other side toward one side in the horizontal direction and that includes a portion extending toward the one side beyond the image forming unit, the discharge path and the feed path at least partially overlapping each other in a vertical direction; and a third transport part that transports the recording medium along a reversing path splitting from the discharge path at an intermediate portion thereof and joining the feed path at an intermediate portion thereof and in which the recording medium to be fed to the feed path is reversed, wherein the reversing path is disposed between the feed path and the discharge path in the vertical direction, and wherein the reversing path includes a changing path in which a recording-medium transport direction is reversed and that is disposed below a top of the image forming unit in the vertical direction.

9. The image forming apparatus according to claim 8, further comprising a measurement part, wherein:

the third transport part transports the recording medium from the other side toward the one side in the horizontal direction, stops the transportation of the recording medium, and then transports the recording medium from the one side toward the other side in the horizontal direction, and the measurement part measures dimensions of the recording medium stopped by the third transport part.

* * * * *